United States Patent
Kuruma et al.

(10) Patent No.: US 8,870,728 B2
(45) Date of Patent: Oct. 28, 2014

(54) CHARGING MEMBER, PROCESS CARTRIDGE, AND ELECTROPHOTOGRAPHIC APPARATUS

(75) Inventors: Yoko Kuruma, Mishima (JP); Noriaki Kuroda, Suntou-gun (JP); Noriko Nagamine, Suntou-gun (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/080,610

(22) Filed: Apr. 5, 2011

(65) Prior Publication Data
US 2011/0182618 A1 Jul. 28, 2011

Related U.S. Application Data

(63) Continuation of application No. PCT/JP2010/007200, filed on Dec. 10, 2010.

(30) Foreign Application Priority Data

Dec. 15, 2009 (JP) ................................. 2009-283902

(51) Int. Cl.
- *C08F 230/08* (2006.01)
- *G03G 15/02* (2006.01)
- *C08G 77/14* (2006.01)
- *C08G 77/04* (2006.01)

(52) U.S. Cl.
CPC ............ *G03G 15/0233* (2013.01); *C08G 77/14* (2013.01); *C08G 77/045* (2013.01)
USPC .............................................. 492/53; 492/25

(58) Field of Classification Search
USPC ............... 492/53, 17, 18, 24, 25, 56
See application file for complete search history.

(56) References Cited

U.S. PATENT DOCUMENTS

| | | | |
|---|---|---|---|
| 5,863,660 A * | 1/1999 | Kumagai et al. | 428/446 |
| 7,693,457 B2 | 4/2010 | Kuruma et al. | |
| 7,962,068 B2 | 6/2011 | Kuroda et al. | |
| 2008/0145095 A1* | 6/2008 | Hoshi et al. | 399/111 |
| 2009/0067880 A1 | 3/2009 | Kuroda et al. | |
| 2010/0137540 A1 | 6/2010 | Ito et al. | |
| 2010/0226684 A1 | 9/2010 | Mayuzumi et al. | |

FOREIGN PATENT DOCUMENTS

| | | |
|---|---|---|
| EP | 0 420 585 A2 | 4/1991 |
| JP | 3-115358 A | 5/1991 |

(Continued)

OTHER PUBLICATIONS

PCT International Search Report and Written Opinion of the International Searching Authority, International Application No. PCT/JP2010/007200, Mailing Date Jan. 18, 2011.

PCT International Search Report, International Application No. PCT/JP2010/007200, Mailing Date Jan. 18, 2011.

(Continued)

*Primary Examiner* — Christopher Besler
(74) *Attorney, Agent, or Firm* — Fitzpatrick, Cella, Harper and Scinto

(57) ABSTRACT

Provided are a charging member capable of maintaining excellent wear resistance even after repeated use, and a process cartridge and an electrophotographic apparatus each having the charging member. The charging member is characterized in that its surface layer has a polysiloxane to which a silsesquioxane is bonded.

9 Claims, 2 Drawing Sheets

(56) References Cited

FOREIGN PATENT DOCUMENTS

| | | |
|---|---|---|
| JP | 2001-173641 A | 6/2001 |
| JP | 2002-38015 A | 2/2002 |
| JP | 2009-58634 A | 3/2009 |
| WO | 2007/100069 A1 | 9/2007 |
| WO | WO 2007100069 A1 * | 9/2007 |
| WO | 2008/123122 A1 | 10/2008 |
| WO | WO 2008123122 A1 * | 10/2008 |

OTHER PUBLICATIONS

Kuroda, et al., U.S. Appl. No. 13/106,632, filed May 12, 2011.
Kuruma, et al., U.S. Appl. No. 13/080,594, filed Apr. 5, 2011.
PCT International Preliminary Report on Patentability and Written Opinion of the International Searching Authority, International Application No. PCT/JP2010/007200, Mailing Date Jun. 28, 2012.
Chinese Office Action dated Jul. 3, 2014 in Chinese Application No. 201080056833.X.

* cited by examiner

CHARGING MEMBER, PROCESS CARTRIDGE, AND ELECTROPHOTOGRAPHIC APPARATUS

CROSS-REFERENCE TO RELATED APPLICATIONS

This application is a continuation of International Application No. PCT/JP2010/007200, filed Dec. 10, 2010, which claims the benefit of Japanese Patent Application No. 2009-283902, filed Dec. 15, 2009.

BACKGROUND OF THE INVENTION

1. Field of the Invention

The present invention relates to a charging member for use in an electrophotographic apparatus, a process cartridge, and an electrophotographic apparatus.

2. Description of the Related Art

In an electrophotographic apparatus, a roller-shaped charging member (which may hereinafter be referred to as "charging roller") for charging the surface of an electrophotographic photosensitive member by contacting the surface of the electrophotographic photosensitive member generally has an elastic layer containing a resin. Such charging roller can sufficiently secure a nip width with the electrophotographic photosensitive member, and as a result, can efficiently and uniformly charge the electrophotographic photosensitive member. However, the elastic layer contains a plasticizer or a low-molecular weight component of the resin for softening. Accordingly, the low-molecular weight component may bleed toward the surface of the charging roller owing to long-term use of the roller. To cope with such problem, Japanese Patent Application Laid-Open No. 2001-173641 discloses a conductive roll whose surface is coated with a bleeding inhibition layer made of an inorganic oxide coating formed by a sol-gel method, and suppressing the bleeding of a low-molecular weight component toward the surface thereof.

Investigations conducted by the inventors of the present invention have found that the conductive roll disclosed in Japanese Patent Application Laid-Open No. 2001-173641 whose bleeding inhibition layer serves as a surface layer wears owing to repeated use and hence its charging performance changes over time.

SUMMARY OF THE INVENTION

In view of the foregoing, the present invention is directed to provide a charging member whose charging performance changes to a small extent over time even after long-term use. Further, the present invention is directed to provide a process cartridge and an electrophotographic apparatus each capable of stably forming high-quality electrophotographic images.

According to one aspect of the present invention, there is provided a charging member, comprising: a support; and a surface layer, in which the surface layer comprises a polysiloxane which has at least one unit selected from a group consisting of a unit A1 to a unit A3 represented by the following formulae and to which at least one compound selected from a group consisting of compounds represented by the following formulae (1) to (6) is bonded through a linking group formed by at least one selected from $R_1$, $R_4$, and $R_6$ in the units, and at least one group selected from $R_{101}$ to $R_{106}$ of the compound represented by the following formula (1), $R_{201}$ to $R_{208}$ of the compound represented by the following formula (2), $R_{301}$ to $R_{310}$ of the compound represented by the following formula (3), $R_{401}$ to $R_{412}$ of the compound represented by the following formula (4), $R_{501}$ to $R_{514}$ of the compound represented by the following formula (5), and $R_{601}$ to $R_{616}$ of the compound represented by the following formula (6).

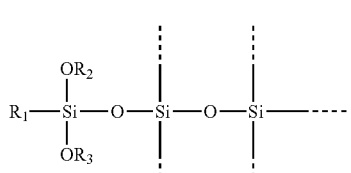

A1

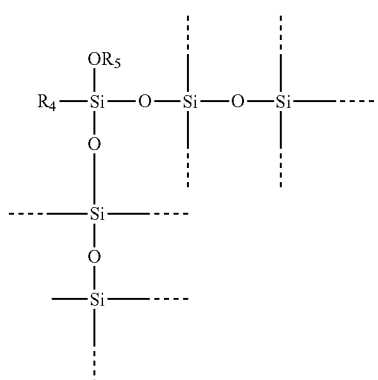

A2

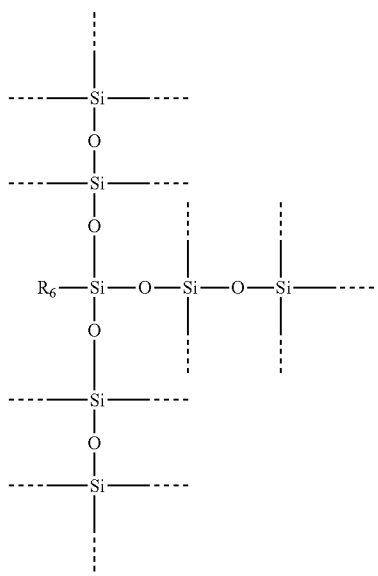

A3

(In the formulae: the at least one group selected from $R_1$, $R_4$, and $R_6$ in the units represented by the units A1 to A3, and the at least one group selected from $R_{101}$ to $R_{106}$ of the following formula (1), $R_{201}$ to $R_{208}$ of the following formula (2), $R_{301}$ to $R_{310}$ of the following formula (3), $R_{401}$ to $R_{412}$ of the following formula (4), $R_{501}$ to $R_{514}$ of the following formula (5), and $R_{601}$ to $R_{616}$ of the following formula (6) represent groups capable of reacting with each other to form the linking group; groups out of $R_1$, $R_4$, and $R_6$ which are uninvolved in bonding with any compound selected from the group consisting of the formulae (1) to (6) each independently represent a substituted or unsubstituted alkyl group, or a substituted or unsubstituted aryl group; $R_2$, $R_3$, and $R_5$ each independently represent a hydrogen atom, or a substituted or unsubstituted alkyl group;

and groups out of $R_{101}$ to $R_{106}$, $R_{201}$ to $R_{208}$, $R_{301}$ to $R_{310}$, $R_{401}$ to $R_{412}$, $R_{501}$ to $R_{514}$, and $R_{601}$ to $R_{616}$ which are uninvolved in bonding with any unit selected from the group consisting of the units A1 to A3 each independently represent any group selected from a substituted or unsubstituted alkyl group and a substituted or unsubstituted aryl group.)
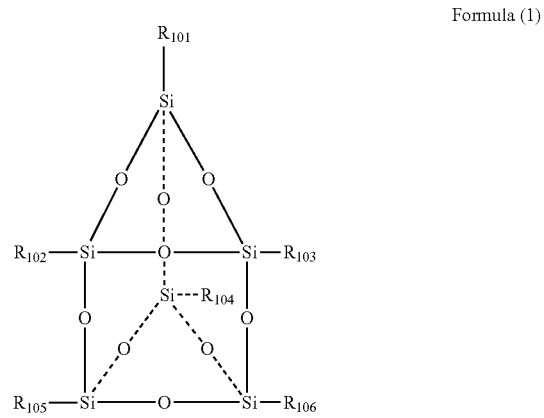
Formula (1)
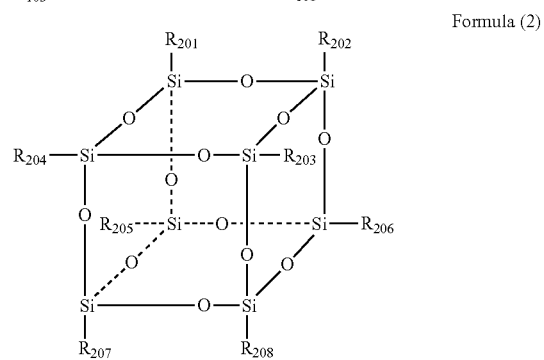
Formula (2)
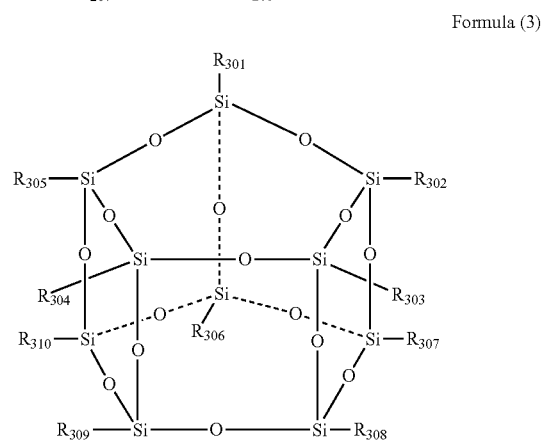
Formula (3)
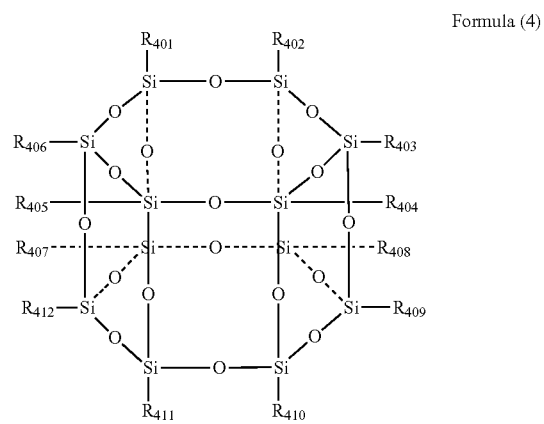
Formula (4)

Formula (5)

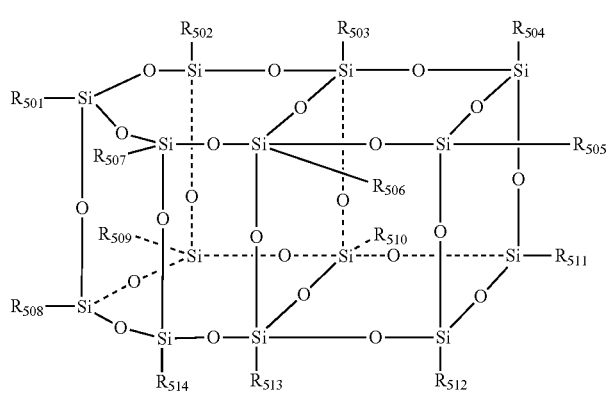

Formula (6)

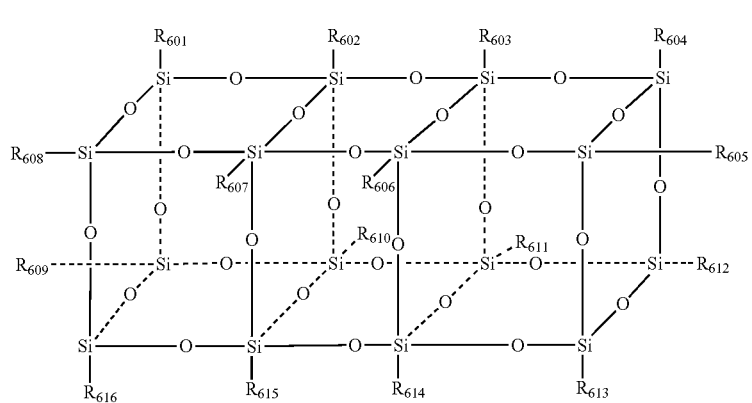

In addition, according to the present invention, there is provided an electrophotographic apparatus having the above-mentioned charging member and an electrophotographic photosensitive member placed in contact with the charging member. Further, according to the present invention, there is provided a process cartridge integrally holding the above-mentioned charging member, and at least one member selected from an electrophotographic photosensitive member, a developing unit, a transferring unit, and a cleaning unit, in which the process cartridge is formed to be detachably mountable on the main body of an electrophotographic apparatus.

According to the present invention, a charging member so excellent in durability that its charging performance hardly changes even after long-term use can be obtained. This is probably because of such reasons as described below. That is, the surface layer according to the present invention contains a polysiloxane to which at least one silsesquioxane selected from the group consisting of the compounds represented by the formulae (1) to (6) is bonded. In the polysiloxane, the silsesquioxane having a specific structure fills a gap in the network structure of the polysiloxane. As a result, the surface layer is reinforced, and hence the charging member may be excellent in durability. In addition, the silsesquioxane is chemically bonded to the polysiloxane, and hence the fallout of the silsesquioxane from the surface layer is suppressed in an extremely effective manner even after the long-term use. This is also probably one reason why the charging member including the surface layer according to the present invention shows extremely excellent wear resistance.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
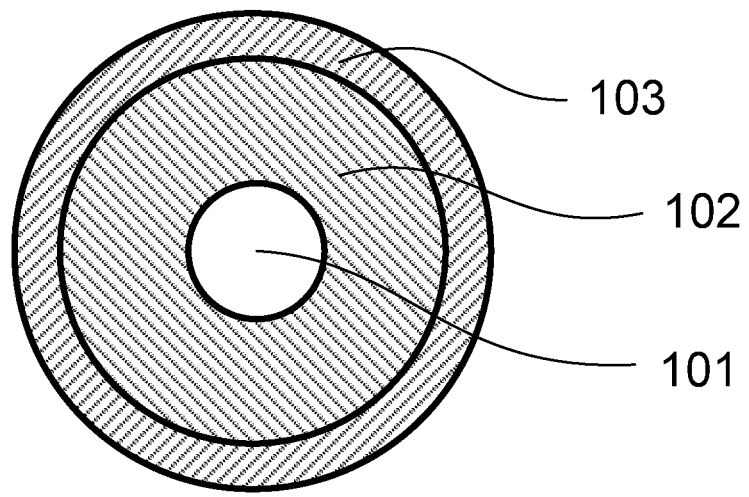
FIG. 1 is a sectional view in a surface perpendicular to the axial direction of a charging roller according to the present invention.

FIG. 1 is a sectional view of a charging roller according to an embodiment of the present invention, and the charging roller has a support 101, a conductive elastic layer 102, and a surface layer 103 in the stated order. Further, the surface layer 103 contains a polysiloxane which has at least one unit selected from a group consisting of a unit A1 to a unit A3 represented by the following formulae and to which at least one compound selected from a group consisting of compounds represented by the following formulae (1) to (6) is bonded through a linking group formed by at least one selected from $R_1$, $R_4$, and $R_6$ in the units, and at least one group selected from $R_{101}$ to $R_{106}$ of the compound represented by the following formula (1), $R_{201}$ to $R_{208}$ of the compound represented by the following formula (2), $R_{301}$ to $R_{310}$ of the compound represented by the following formula (3), $R_{401}$ to $R_{412}$ of the compound represented by the following formula (4), $R_{501}$ to $R_{514}$ of the compound represented by the following formula (5), and $R_{601}$ to $R_{616}$ of the compound represented by the following formula (6).

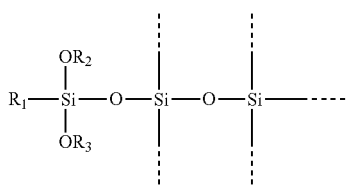

A1

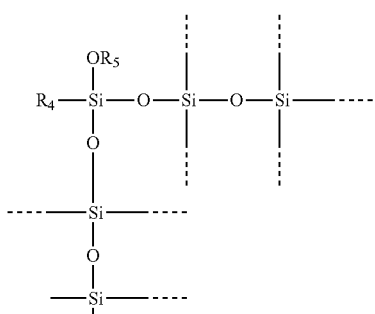

A2

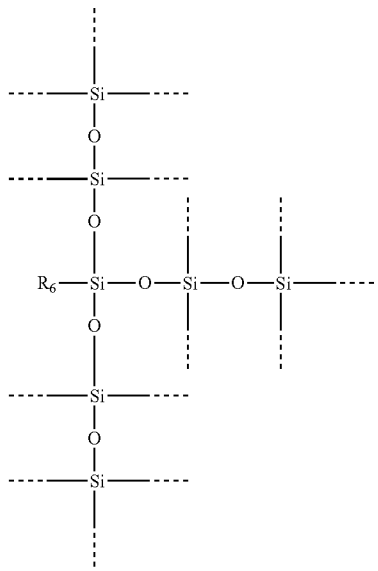

A3

(In the formula: the at least one group selected from $R_1$, $R_4$, and $R_6$ in the units represented by the units A1 to A3, and the at least one group selected from $R_{101}$ to $R_{106}$ of the following formula (1), $R_{201}$ to $R_{208}$ of the following formula (2), $R_{301}$ to $R_{310}$ of the following formula (3), $R_{401}$ to $R_{412}$ of the following formula (4), $R_{501}$ to $R_{514}$ of the following formula (5), and $R_{601}$ to $R_{616}$ of the following formula (6) represent groups capable of reacting with each other to form the linking group; groups out of $R_1$, $R_4$, and $R_6$ which are uninvolved in bonding with any compound selected from the group consisting of the formulae (1) to (6) each independently represent a substituted or unsubstituted alkyl group, or a substituted or unsubstituted aryl group; $R_2$, $R_3$, and $R_5$ each independently represent a hydrogen atom, or a substituted or unsubstituted alkyl group; and groups out of $R_{101}$ to $R_{106}$, $R_{201}$ to $R_{208}$, $R_{301}$ to $R_{310}$, $R_{401}$ to $R_{412}$, $R_{501}$ to $R_{514}$, and $R_{601}$ to $R_{616}$ which are uninvolved in bonding with any unit selected from the group consisting of the units A1 to A3 each independently represent any group selected from a substituted or unsubstituted alkyl group and a substituted or unsubstituted aryl group.)

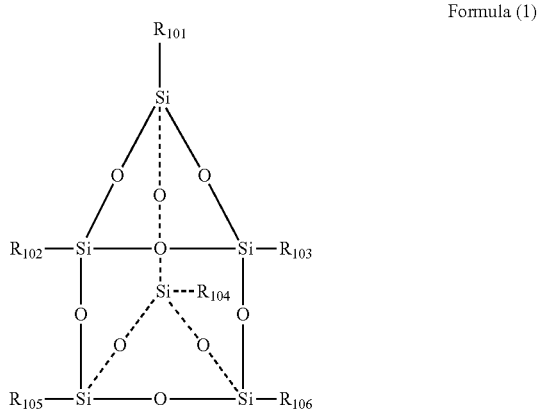

Formula (1)

-continued
Formula (2)
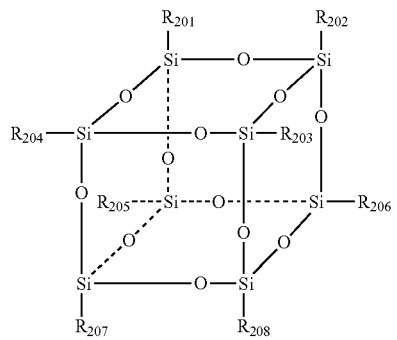
Formula (3)
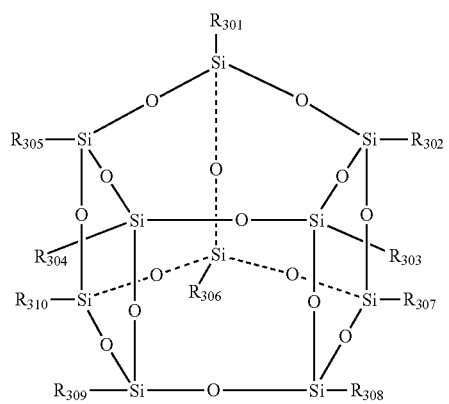
Formula (4)
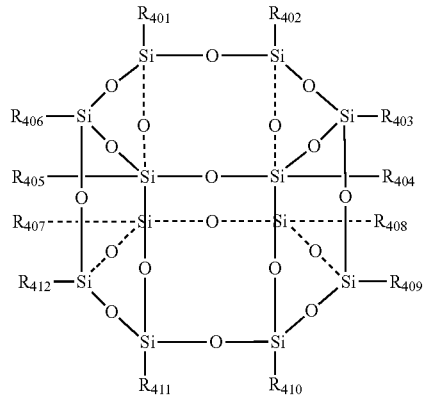
Formula (5)
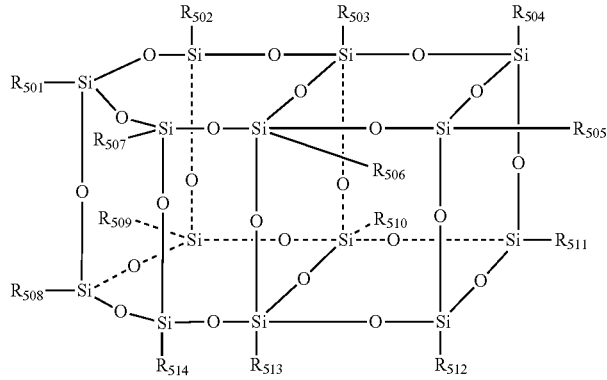

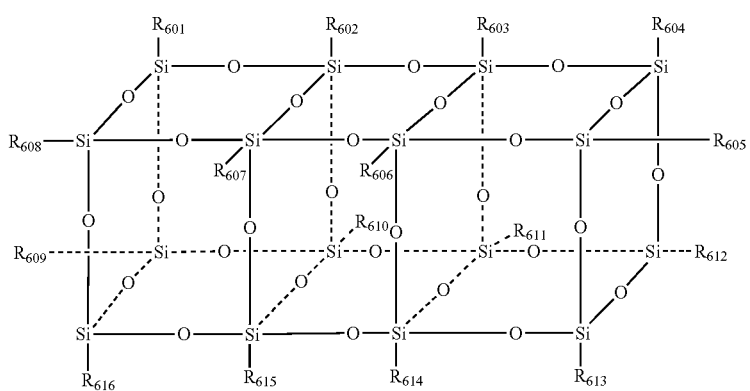

Formula (6)

The above-mentioned polysiloxane unit A1 according to the present invention can be represented as $SiO_{0.5}R^1(OR^2)(OR^3)$ as well. An oxygen atom (O of Si—O—Si) except the oxygen atom of an alkoxy group in the A1 is bonded to two silicon atoms, and hence the number of oxygen atoms (O of Si—O—Si) to which one silicon atom is bonded is considered to be 0.5. Similarly, the polysiloxane units A2 and A3 can be represented as $SiO_{1.0}R^4(OR^5)$ and $SiO_{1.5}R^6$, respectively.

In addition, the at least one group selected from $R_1$, $R_4$, and $R_6$ in the polysiloxane units A1 to A3, and the at least one group selected from $R_{101}$ to $R_{106}$ of the above-mentioned formula (1), $R_{201}$ to $R_{208}$ of the above-mentioned formula (2), $R_{301}$ to $R_{310}$ of the above-mentioned formula (3), $R_{401}$ to $R_{412}$ of the above-mentioned formula (4), $R_{501}$ to $R_{514}$ of the above-mentioned formula (5), and $R_{601}$ to $R_{616}$ of the above-mentioned formula (6) react with each other to form the linking group. Specific examples of such groups are shown below.

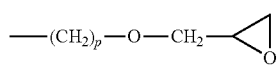

Formula (7)

(In the above-mentioned formula (7), p represents an integer of 1 or more and 10 or less.)

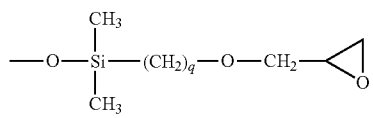

Formula (8)

(In the above-mentioned formula (8), q represents an integer of 1 to 10.)

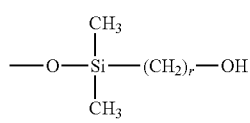

Formula (9)

(In the above-mentioned formula (9), r represents an integer of 1 to 10.)

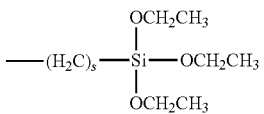

Formula (10)

(In the above-mentioned formula (10), s represents an integer of 1 to 10.)

Figure 3:
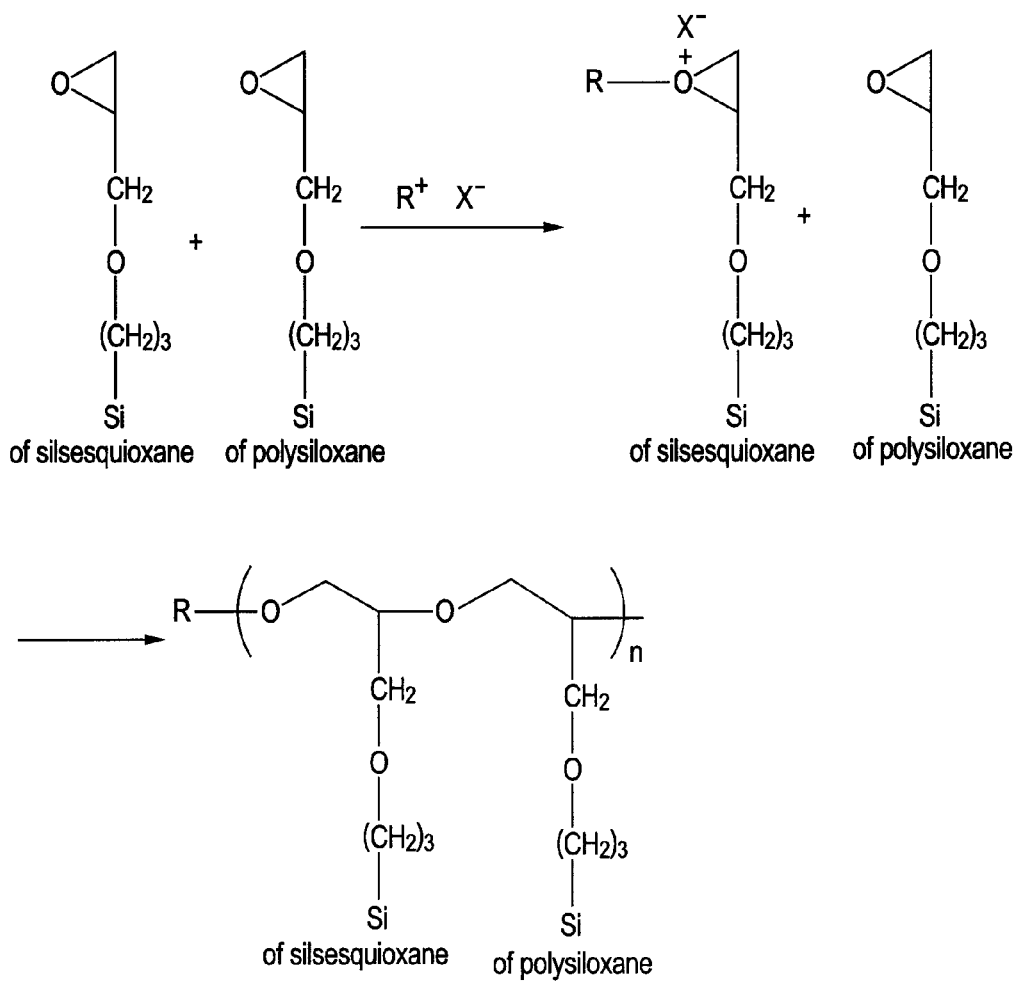
FIG. 3 is an explanatory view of a mechanism for a reaction between a polysiloxane and a silsesquioxane.

FIG. 3 illustrates a reaction scheme in, for example, the case where both the at least one group selected from $R_1$, $R_4$, and $R_6$, and the at least one group selected from $R_{101}$ to $R_{106}$ of the above-mentioned formula (1), $R_{201}$ to $R_{208}$ of the above-mentioned formula (2), $R_{301}$ to $R_{310}$ of the above-mentioned formula (3), $R_{401}$ to $R_{412}$ of the above-mentioned formula (4), $R_{501}$ to $R_{514}$ of the above-mentioned formula (5), and $R_{601}$ to $R_{616}$ of the above-mentioned formula (6) are each a "glycidoxypropyl group" represented by the above-mentioned formula (7) where p equals 3. That is, a glycidoxypropyl group bonded to a silsesquioxane or a siloxane undergoes chain polymerization through the ring-opening of its epoxy ring in the presence of a cationic polymerization catalyst (represented as $R^+X^-$ in FIG. 3). As a result, a polysiloxane to which at least one silsesquioxane selected from the formulae (1) to (6) is chemically bonded through a linking group including an oxyalkylene group (—O—$CH_2$—$CH_2$—) is produced.

In addition, when both the at least one group selected from $R_1$, $R_4$, and $R_6$, and the at least one group selected from $R_{101}$ to $R_{106}$ of the above-mentioned formula (1), $R_{201}$ to $R_{208}$ of the above-mentioned formula (2), $R_{301}$ to $R_{310}$ of the above-mentioned formula (3), $R_{401}$ to $R_{412}$ of the above-mentioned formula (4), $R_{501}$ to $R_{514}$ of the above-mentioned formula (5), and $R_{601}$ to $R_{616}$ of the above-mentioned formula (6) are each a group represented by the above-mentioned formula (9) or the above-mentioned formula (10), a polysiloxane to which a silsesquioxane is chemically bonded through a linking group including a siloxane bond is produced by hydrolyzing and condensing the groups.

Groups out of $R_1$, $R_4$, and $R_6$ which are uninvolved in bonding with any silsesquioxane selected from the group consisting of the formulae (1) to (6) each independently represent a substituted or unsubstituted alkyl group, or a substituted or unsubstituted aryl group. Examples of the substituted or unsubstituted alkyl group include, for example, alkyl groups each having 1 to 10 carbon atoms, and fluorinated alkyl groups obtained by substituting hydrogen atoms of these alkyl groups with fluorine atoms. The substituted or unsubstituted aryl group is a phenyl group which may be substituted with an alkyl group having 1 to 3 carbon atoms. In addition, $R_2$, $R_3$, and $R_5$ each independently represent a hydrogen atom, or a substituted or unsubstituted alkyl group. Such substituent is, for example, an alkyl group having 1 to 3 carbon atoms.

Here, all $R_{101}$ to $R_{616}$ are preferably involved in bonding with the polysiloxane from the following viewpoint. The number of bonding sites to the polysiloxane is increased so that the wear resistance of the surface film may be maintained over a long time period.

Further, it is preferred that: the polysiloxane according to the present invention contain the compound unit (2) and at least one unit selected from the units A1 to A3; and both of each of all $R_{201}$ to $R_{208}$ and one of $R_1$, $R_4$, and $R_6$ form an oxyalkylene structure so as to be bonded to each other. The compound unit (2) having eight Si atoms is preferred from the viewpoint of the ease with which the surface film is produced.

An estimated content of the compounds (1) to (6) with respect to the units A1 to A3 for forming the polysiloxane falls within the range of preferably 1.0 part by mol or more and 50.0 parts by mol or less, particularly preferably 5.0 parts by mol or more and 20.0 parts by mol or less in consideration of, for example, the mechanical strength of the surface layer and a dielectric characteristic requested of the charging member. Meanwhile, in the above-mentioned formulae (1) to (6), groups out of $R_{101}$ to $R_{616}$ in the above-mentioned compound units (1) to (6) which are uninvolved in reactions with $R_1$, $R_4$, and $R_6$ each independently represent a substituted or unsubstituted alkyl group (such as an alkyl group having 1 to 10 carbon atoms), or a substituted or unsubstituted aryl group (such as a phenyl group which may be substituted with an alkyl group having 1 to 3 carbon atoms or a halogen atom).

The polysiloxane to be incorporated into materials for forming the surface layer of the charging member according to the present invention can be obtained through, for example, the following steps (I) to (III).

(I) a condensing step of condensing a hydrolyzable silane compound and a hydrolyzable silane compound having a group capable of cationic polymerization through hydrolysis;

(II) a mixing step of adding at least one selected from the above-mentioned compounds (1) to (6) into the hydrolyzable condensate obtained by the step (I); and (III) a crosslinking step of crosslinking the mixture obtained by the step (II) through the cleavage of the group capable of cationic polymerization.

The amount of water used in the hydrolysis in the step (I), i.e., the condensing step preferably falls within the range of 20 mass % to 50 mass % with respect to the total amount of the hydrolyzable silane compounds used in the step (I).

In addition, a hydrolyzable silane compound having at least one kind of a group selected from substituted or unsubstituted aryl groups is preferably used as the hydrolyzable silane compound. Of such compounds, a hydrolyzable silane compound having an aryl group having a structure represented by the following formula (11) is more preferred.

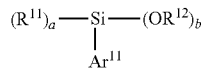

Formula (11)

In the above-mentioned formula (11), $R^{11}$ and $R^{12}$ each independently represent a substituted or unsubstituted alkyl group, $Ar^{11}$ represents a substituted or unsubstituted aryl group, a represents an integer of 0 or more and 2 or less, b represents an integer of 1 or more and 3 or less, and a and b satisfy the relationship of a+b=3. The substituted alkyl group represented by each of $R^{11}$ and $R^{12}$ is, for example, a fluorinated alkyl group, and the unsubstituted alkyl group represented by each of $R^{11}$ and $R^{12}$ is, for example, a methyl group, an ethyl group, a propyl group, a hexyl group, or a decyl group. Of those, a methyl group, an ethyl group, or a propyl group is preferred as the alkyl group represented by $R^{12}$. In addition, the aryl group $Ar^{11}$ in the formula (11) is preferably a phenyl group. When a in the formula (11) represents 2, $R^{11}$'s may be identical to or different from each other. In addition, when b in the formula (11) represents 2 or 3, two or three $R^{12}$'s may be identical to or different from each other. Only one kind of the hydrolyzable silane compounds each having an aryl group may be used, or two or more kinds of them may be used. Specific examples of the hydrolyzable silane compound having an aryl group represented by the formula (11) are described below.

(11-1) Phenyltrimethoxysilane (11-2) Phenyltriethoxysilane (11-3) Phenyltripropoxysilane A hydrolyzable silane compound having a structure represented by the following formula (12) is suitable as the hydrolyzable silane compound having a group capable of cationic polymerization.

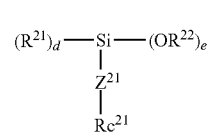

Formula (12)

In the formula (12), $R^{21}$ and $R^{22}$ each independently represent a substituted or unsubstituted alkyl group, $Z^{21}$ represents a divalent organic group, $Rc^{21}$ represents a group capable of cationic polymerization which can produce an oxyalkylene group through cleavage, d represents an integer of 0 or more and 2 or less, e represents an integer of 1 or more and 3 or less, and d and e satisfy the relationship of d+e=3. The group $Rc^{21}$ capable of cationic polymerization in the formula (12) represents an organic group capable of cationic polymerization which can produce an oxyalkylene group through cleavage. Examples of the group $Rc^{21}$ capable of cationic polymerization include cyclic ether groups such as a glycidoxy group, an epoxy group, and an oxetane group, and a vinyl ether group. Of those, a glycidoxy group or an epoxy group is preferred from the viewpoints of the ease of availability and the ease with which the reaction is controlled. In addition, the oxyalkylene group is a divalent group having a structure represented by —O—R— (—R—: an alkylene group) (which may be referred to as "alkylene ether group"). The substituted alkyl group represented by $R^{21}$ in the formula (12) is, for example, a fluorinated alkyl group, and the unsubstituted alkyl group represented by $R^{21}$ is, for example, a methyl group, an ethyl group, a propyl group, a hexyl group, or a decyl group. Of those, an unsubstituted or branched alkyl group having 1 to 3 carbon atoms is preferred as $R^{22}$, and a methyl group or an ethyl group is more preferred as $R^{22}$. Examples of the divalent organic group $Z^{21}$ in the formula (12) include alkylene groups and arylene groups. Of those, an alkylene group having 1 to 6 carbon atoms is preferred, and an ethylene group or a propylene group is more preferred.

In addition, e in the formula (12) preferably represents 3. When d in the formula (12) represents 2, two $R^{21}$'s may be identical to or different from each other. In addition, when e in the formula (12) represents 2 or 3, two or three $R^{22}$'s may be identical to or different from each other. Only one kind of the hydrolyzable silane compounds each having a group capable of cationic polymerization may be used, or two or more kinds of them may be used. Specific examples of the hydrolyzable silane compound having a structure represented by the formula (12) are described below.

(12-1) Glycidoxypropyltrimethoxysilane
(12-2) Glycidoxypropyltriethoxysilane
(12-3) Epoxycyclohexylethyltrimethoxysilane
(12-4) Epoxycyclohexylethyltriethoxysilane In addition, a hydrolyzable silane compound having a structure represented by the following formula (13) is preferably further used in combination with the hydrolyzable silane compound having an aryl group and the hydrolyzable silane compound having a group capable of cationic polymerization in the step (I). In this case, the releasability of the surface of the charging member to be produced can be improved. The use of the hydrolyzable silane compound having a structure represented by the following formula (13) turns the polysiloxane to be obtained into a polysiloxane having a fluorinated alkyl group (perfluoroalkyl group).

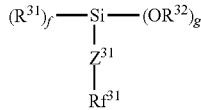

Formula (13)

In the formula (13), $R^{31}$ and $R^{32}$ each independently represent a substituted or unsubstituted alkyl group, $Z^{31}$ represents a divalent organic group, $Rf^{31}$ represents a fluorinated alkyl group having 1 or more and 11 or less carbon atoms, f represents an integer of 0 to 2, g represents an integer of 1 to 3, and f and g satisfy the relationship of f+g=3. Examples of the substituted alkyl group represented by each of $R^{31}$ and $R^{32}$ in the formula (13) include fluorinated alkyl groups, and examples of the unsubstituted alkyl group represented by each of $R^{31}$ and $R^{32}$ include a methyl group, an ethyl group, a propyl group, a hexyl group, and a decyl group. Of those, a linear or branched alkyl group having 1 to 3 carbon atoms is preferred as $R^{32}$, and a methyl group or an ethyl group is more preferred as $R^{32}$. In addition, examples of the divalent organic group represented by $Z^{31}$ in the formula (13) include alkylene groups and arylene groups. Of those, an alkylene group having 1 to 6 carbon atoms is preferred, and an ethylene group is more preferred. In addition, the fluorinated alkyl group having 1 or more and 11 or less carbon atoms represented by $Rf^{31}$ in the formula (13) is particularly preferably a linear fluorinated alkyl group having 6 to 11 carbon atoms from the viewpoint of the releasability of toner, an external additive, or the like. Examples of the fluorinated alkyl group include fluorinated alkyl groups obtained by substituting at least one hydrogen atom of the corresponding unsubstituted alkyl group with a fluorine atom. Of those, a perfluoroalkyl group obtained by substituting all hydrogen atoms bonded to the carbon atoms of the corresponding alkyl group with fluorine atoms is preferred. g in the formula (13) preferably represents 3. In addition, when f in the formula (13) represents 2, two $R^{31}$'s may be identical to or different from each other. When g in the formula (13) represents 2 or 3, two or three $R^{32}$'s may be identical to or different from each other. Specific examples of the hydrolyzable silane compound having a structure represented by the formula (13) are described below.

 (13-1)

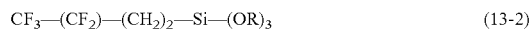 (13-2)

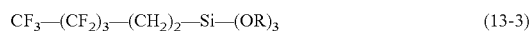 (13-3)

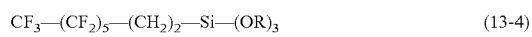 (13-4)

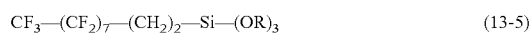 (13-5)

 (13-6)

R in each of the formulae (13-1) to (13-6) represents a methyl group or an ethyl group.

Of the formulae (13-1) to (13-6), the formulae (13-4) to (13-6) are preferred. Only one kind of the hydrolyzable silane compounds each having a fluorinated alkyl group may be used, or two or more kinds of them may be used.

In the present invention, a hydrolyzable silane except the above-mentioned hydrolyzable silane compounds may be further used in the step (I). The hydrolyzable silane except the above-mentioned hydrolyzable silane compounds is, for example, a hydrolyzable silane compound having a structure represented by the following formula (14).

 Formula (14)

In the above-mentioned formula (14), $R^{41}$ represents a substituted or unsubstituted alkyl group, $R^{42}$ represents a saturated or unsaturated monovalent hydrocarbon group, h represents an integer of 0 to 3, k represents an integer of 1 to 4, and h and k satisfy the relationship of h+k=4. Examples of the substituted alkyl group represented by $R^{41}$ in the formula (14) include fluorinated alkyl groups, and the unsubstituted alkyl group represented by $R^{41}$ preferably has 1 to 21 carbon atoms. Of those, a methyl group, an ethyl group, a propyl group, a hexyl group, or a decyl group is particularly preferred. h in the formula (14) preferably represents an integer of 1 to 3, in particular, more preferably represents 1. In addition, k in the formula (14) preferably represents an integer of 1 to 3, in particular, more preferably represents 3. Examples of the saturated or unsaturated monovalent hydrocarbon group represented by $R^{42}$ in the formula (14) include alkyl groups, alkenyl groups, and aryl groups. Of those, a linear or branched alkyl group having 1 to 3 carbon atoms is preferred, and a methyl group, an ethyl group, or an n-propyl group is more preferred. When h in the formula (14) represents 2 or 3, two or three $R^{41}$'s may be identical to or different from each other. In addition, when k in the formula (14) represents 2, 3, or 4, two, three, or four $R^{42}$'s may be identical to or different from each other. Only one kind of the hydrolyzable silane compounds each having a structure represented by the formula (14) may be used, or two or more kinds of them may be used. Specific examples of the hydrolyzable silane compound having a structure represented by the formula (14) are described below.

(414-1) Methyltrimethoxysilane
(414-2) Methyltriethoxysilane
(414-3) Methyltripropoxysilane
(414-4) Ethyltrimethoxysilane
(414-5) Ethyltriethoxysilane
(414-6) Ethyltripropoxysilane
(414-7) Propyltrimethoxysilane
(414-8) Propyltriethoxysilane
(414-9) Propyltripropoxysilane
(414-10) Hexyltrimethoxysilane
(414-11) Hexyltriethoxysilane (414-12) Decyltrimethoxysilane
(414-13) Decyltriethoxysilane
(414-14) Decyltripropoxysilane In addition, any resin can be used in combination with the silane compounds. Examples of the resin include a silicone-based resin, a urethane-based resin, an epoxy-based resin, an acrylic-based resin, a fluorine-based resin, a styrene-based resin, and a phenol-based resin.

Next, the configuration of the charging member of the present invention is described while a specific method of forming the surface layer containing the polysiloxane is mentioned.

<Support>

A support made of a metal (alloy) such as iron, copper, stainless steel, aluminum, aluminum alloy, or nickel can be used as the support 101.

<Elastic Layer>

One kind or two or more kinds of elastic bodies such as rubbers and thermoplastic elastomers used in the elastic layers (conductive elastic layers) of the conventional charging members can each be used as a material for forming the conductive elastic layer. Specific examples of the rubbers include the following: a urethane rubber, a silicone rubber, a butadiene rubber, an isoprene rubber, a chloroprene rubber, a styrene-butadiene rubber, an ethylene-propylene rubber, a polynorbornene rubber, a styrene-butadiene-styrene rubber, an acrylonitrile rubber, an epichlorohydrin rubber, and/or an alkyl ether rubber.

The thermoplastic elastomer is, for example, a styrene-based elastomer or an olefin-based elastomer. A commercially available product of the styrene-based elastomer is, for example, "RABALON" (trade name, manufactured by Mitsubishi Chemical Corporation) or "SEPTON compound" (trade name, manufactured by KURARAY CO., LTD.). A commercially available product of the olefin-based elastomer is, for example, "Thermolan" (trade name, manufactured by Mitsubishi Chemical Corporation), "Milastomer" (trade name, manufactured by Mitsui Chemicals, Inc.), "Sumitomo TPE" (trade name, manufactured by Sumitomo Chemical Co., Ltd.), or "Santoprene" (trade name, Advanced Elastomer Systems, L.P.).

In addition, the conductivity of the conductive elastic layer can be set to a predetermined value by appropriately using a conductive agent. The electrical resistance of the conductive elastic layer can be adjusted by appropriately selecting the kind and usage of the conductive agent. The electrical resistance suitably ranges from $10^2\Omega$ to $10^8\Omega$, in particular, $10^3\Omega$ to $10^6\Omega$.

Examples of the conductive agent to be used in the conductive elastic layer include a cationic surfactant, an anionic surfactant, an amphoteric surfactant, an antistatic agent, and an electrolyte. The cationic surfactant is, for example, a quaternary ammonium salt. A quaternary ammonium ion of the quaternary ammonium salt is specifically exemplified by a lauryltrimethylammonium ion or a stearyltrimethylammonium ion. Further, a counter ion of the quaternary ammonium ion is specifically exemplified by a halide ion or a perchloric acid ion. Further, specific examples of the anionic surfactant include an aliphatic sulfonic acid salt and a higher alcohol sulfuric acid ester salt.

Specific examples of the antistatic agent include a non-ionic antistatic agent such as a higher alcohol ethylene oxide or a polyethylene glycol fatty acid ester. Examples of the electrolyte include salts of metals (such as Li, Na, and K) of the first group of the periodic table. Specific examples thereof include salts (e.g., $LiCF_3SO_3$ and $NaClO_4$) of metals of the first group of the periodic table.

Further, examples of the conductive agent include salts (e.g., $Ca(ClO_4)_2$) of metals (such as Ca and Ba) of the second group of the periodic table. In addition, conductive carbon black, graphite, metal oxides (such as tin oxide, titanium oxide, and zinc oxide), metals (such as nickel, copper, silver, and germanium), and conductive polymers (such as polyaniline, polypyrrole, and polyacetylene) can also be used.

Further, an inorganic or organic filler or a crosslinking agent may be added to the conductive elastic layer. The filler is, for example, silica (white carbon), calcium carbonate, magnesium carbonate, clay, talc, bentonite, zeolite, alumina, barium sulfate, or aluminum sulfate. Examples of the crosslinking agent include sulfur, a peroxide, a crosslinking aid, a crosslinking accelerator, a crosslinking accelerator aid, and a crosslinking retarder.

The conductive elastic layer has an Asker C hardness of preferably 70° or more, in particular, more preferably 73° or more from such a viewpoint that the deformation of the charging member is suppressed when the charging member and an electrophotographic photosensitive member as a body to be charged are brought into abutment with each other. In the present invention, the Asker C hardness was measured under the condition of a load of 1,000 g by bringing the indenter point of an ASKER Durometer Type C (manufactured by Kobunshi Keiki Co., Ltd.) into abutment with the surface of a measuring object.

Hereinafter, a specific example of the method of forming the surface layer is described. First, the hydrolyzable silane compound and the hydrolyzable silane compound having a group capable of cationic polymerization, and as required, the other hydrolyzable silane compound are subjected to a hydrolysis reaction in the presence of water so that a hydrolyzable condensate may be obtained (step I). Controlling a temperature, a pH, and the like at the time of the hydrolysis reaction can provide a hydrolyzable condensate having a desired degree of condensation.

In addition, at the time of the hydrolysis reaction, the degree of condensation may be controlled by utilizing, for example, a metal alkoxide as a catalyst for the hydrolysis reaction. Examples of the metal alkoxide include an aluminum alkoxide, a titanium alkoxide, and a zirconium alkoxide, and complexes thereof (such as an acetylacetone complex).

The amount of water used in the hydrolysis in the step (I), i.e., the condensing step preferably falls within the range of 20 mass % to 50 mass % with respect to the total amount of the hydrolyzable silane compounds used in the step (I).

In addition, a hydrolyzable silane compound having at least one kind of a group selected from substituted and unsubstituted aryl groups is preferably used as the hydrolyzable silane compound. Of such compounds, a hydrolyzable silane compound having an aryl group having a structure represented by the formula (11) is more preferred.

In addition, a blending ratio between the hydrolyzable silane compound and the hydrolyzable silane compound having a group capable of cationic polymerization upon production of the hydrolyzable condensate is preferably such that the contents of the respective groups of the polysiloxane obtained by crosslinking the mixture through the cleavage of the group capable of cationic polymerization in the step (III) fall within the following ranges with respect to the total mass of the polysiloxane.

Content of aryl groups: 2 mass % or more and 30 mass % or less

Content of alkyl groups: 2 mass % or more and 30 mass % or less

Content of oxyalkylene groups: 5 mass % or more and 50 mass % or less
Content of a siloxane portion: 30 mass % or more and 60 mass % or less The total content of the aryl groups, alkyl groups, and oxyalkylene groups is preferably 20 mass % to 40 mass %, more preferably 25 mass % to 35 mass %. The hydrolyzable silane compound having an aryl group is more preferably blended so that its content may fall within the range of 10 mol % to 50 mol % with respect to all the hydrolyzable silane compounds.

In addition, also in the case where the hydrolyzable silane compound having a structure represented by the formula (13) is used in combination in the step (I), it is preferred that the contents of the respective groups of the polysiloxane obtained by crosslinking the mixture through the cleavage of the group capable of cationic polymerization in the step (III) fall within the following ranges with respect to the total mass of the polysiloxane.
Content of aryl groups: 2 mass % or more and 30 mass % or less
Content of alkyl groups: 2 mass % or more and 30 mass % or less
Content of oxyalkylene groups: 5 mass % or more and 50 mass % or less
Content of fluorinated alkyl groups: 2 mass % or more and 30 mass % or less
Content of a siloxane portion: 30 mass % or more and 70 mass % or less The total content of the aryl groups, alkyl groups, oxyalkylene groups, fluorinated alkyl groups, and siloxane portion is preferably 10 mass % to 60 mass %, more preferably 20 mass % to 50 mass % with respect to the total mass of the polysiloxane. In addition, the hydrolyzable silane compound having a group capable of cationic polymerization and the hydrolyzable silane compound containing a fluorinated alkyl group are more preferably blended so that their molar ratio may fall within the range of 10:1 to 1:10.

Next, one or two or more silsesquioxanes selected from the group consisting of the compounds (1) to (6) are added and mixed into the resultant hydrolyzable condensate (step II).

Commercially available products may be used as the compounds (1) to (6), or products synthesized by known methods may be used as the compounds. That is, the silsesquioxane according to the present invention can be synthesized by subjecting a silane compound having an arbitrary substituent and three hydrolyzable groups to hydrolysis and dehydration condensation. Examples of the hydrolyzable groups include an alkoxy group and a chlorine atom. For example, an octahydro-polyoctasilsesquioxane can be obtained by subjecting trichlorosilane to hydrolysis and dehydration condensation in the presence of water, a solvent, and a basic catalyst. Examples of the basic catalyst include: alkali metal oxides such as potassium hydroxide, sodium hydroxide, and cesium hydroxide; and ammonium hydroxide salts such as tetramethylammonium hydroxide and benzyltrimethylammonium hydroxide. Of those, tetramethylammonium hydroxide is preferred because of its high catalytic activity. Water in an aqueous solution of the basic catalyst can be converted for use in the hydrolysis, or water may be separately added for use in the hydrolysis. The amount of water is equal to or larger than the amount enough to hydrolyze the hydrolyzable groups, and is preferably 1.0 to 1.5 times as large as the theoretical amount. Alcohols such as methanol, ethanol, and 2-propanol, and other polar solvents can each be used as the solvent. A lower alcohol having 1 to 6 carbon atoms is preferred from the viewpoint of compatibility with water. A reaction temperature at the time of the synthesis is preferably 0° C. to 60° C., more preferably 20° C. to 40° C. Setting the reaction temperature within the above-mentioned range can suppress the remaining of hydrolyzable groups in unreacted states. In addition, the setting can suppress the occurrence of a complex condensation reaction due to an excessively high reaction rate, and hence an excessive increase in the molecular weight of the hydrolysate can be suppressed. In addition, an estimated reaction time is preferably 2 hours or more for such sufficient progress of the hydrolysis that the remaining of hydrolyzable groups in unreacted states is suppressed. After the termination of the hydrolysis reaction, water or a water-containing reaction solvent may be separated. An approach such as evaporation under reduced pressure can be employed as an approach to separating water or the water-containing reaction solvent. In order that moisture or any other impurity may be sufficiently removed, the following method can be adopted. A non-polar solvent is added to dissolve the hydrolysate, and then the solution is washed with a salt solution or the like. After that, the washed product is dried with a drying agent such as anhydrous magnesium sulfate.

The structure of the resultant silsesquioxane can be identified by employing a known analytical method such as $^{29}$Si nuclear magnetic resonance spectroscopy, $^{13}$C nuclear magnetic resonance spectroscopy, or Fourier-transform infrared absorption spectroscopy.

With regard to an estimated addition amount of the compounds (1) to (6), the compounds (1) to (6) are added in an amount of 1.0 mol or more and 50.0 mol or less, in particular, 5.0 mol or more and 20.0 mol or less with respect to the total amount of the polysiloxane solid content when all the hydrolyzable silane compounds are subjected to dehydration condensation, i.e., 100 mol.

Next, an application liquid for the formation of the surface layer containing the hydrolyzable condensate and at least one of the compounds (1) to (6) is prepared, and then a coating film of the application liquid is formed on the layer directly below the surface layer (such as the elastic layer or the support).

Upon preparation of the application liquid, a solvent as well as the hydrolyzable condensate may be used for improving the application property of the liquid. Examples of the solvent include alcohols such as ethanol and 2-butanol, ethyl acetate, methyl isobutyl ketone, methyl ethyl ketone, and mixtures thereof. In addition, a method such as application involving the use of a roll coater, immersion application, or ring application can be adopted upon application of the application liquid for the surface layer onto the conductive elastic layer.

Next, the coating film is irradiated with an active energy ray. As a result, the group capable of cationic polymerization of the hydrolyzable condensate in the coating film undergoes cleavage. Thus, the hydrolyzable condensate in the surface application liquid layer can be crosslinked. The hydrolyzable condensate cures by the crosslinking, and then the cured product is dried (step III). Here, when at least one of the compound units (1) to (6) added in the step (II) has an alkyl group or aryl group substituted with an epoxy group as "R", the group reacts with the epoxy group or glycidoxy group of the formula (12) to form an oxyalkylene group. As a result, the surface layer is formed.

UV light is preferred as the active energy ray. When UV light is used in the crosslinking reaction, the hydrolyzable condensate can be crosslinked in a short time period (within 15 minutes). Moreover, the quantity of generated heat is small, and a crimp or crack is hardly produced in the surface layer. In addition, when the crosslinking reaction is performed with UV light that results in the generation of a small quantity of heat, adhesiveness between the conductive elastic layer and the surface layer is improved, and hence the surface layer becomes able to sufficiently follow the expansion and contraction of the conductive elastic layer. Accordingly, a crimp or crack in the surface layer due to changes in the temperature and humidity of an environment can be suppressed. In addition, when the crosslinking reaction is performed with UV light, the deterioration of the conductive elastic layer due to thermal hysteresis can be suppressed. Accordingly, reductions in the electrical characteristics of the conductive elastic layer can also be suppressed. A high-pressure mercury lamp, a metal halide lamp, a low-pressure mercury lamp, an excimer UV lamp, or the like can be used for the irradiation of UV light. Of those, an UV light source rich in UV light having a wavelength of 150 nm to 480 nm is preferably used.

It should be noted that the integral light quantity of UV light is defined as described below.

UV integral light quantity [mJ/cm$^2$]=UV light intensity [mW/cm$^2$]×irradiation time [s]

The integral light quantity of UV light can be adjusted depending on, for example, the irradiation time, a lamp output, and a distance between the lamp and a body to be irradiated. In addition, the integral light quantity may be provided with a gradient within the irradiation time. When a low-pressure mercury lamp is used, the integral light quantity of UV light can be measured with a UV integral actinometer "UIT-150-A" (trade name) or "UVD-S254" (trade name) manufactured by USHIO INC. When an excimer UV lamp is used, the integral light quantity of UV light can be measured with a UV integral actinometer "UIT-150-A" (trade name) or "VUV-S172" (trade name) manufactured by USHIO INC.

In addition, a cationic polymerization catalyst (polymerization initiator) is preferably caused to coexist at the time of the crosslinking reaction from the viewpoint of an improvement in crosslinking efficiency. For example, when the group capable of cationic polymerization is an epoxy group, an onium salt of a Lewis acid is preferably used as the cationic polymerization catalyst because the epoxy group shows high reactivity for the onium salt of the Lewis acid activated by the active energy ray.

Any other cationic polymerization catalyst is, for example, a borate, a compound having an imide structure, a compound having a triazine structure, an azo compound, or a peroxide. Of the various cationic polymerization catalysts, an aromatic sulfonium salt or an aromatic iodonium salt is preferred from the viewpoints of sensitivity, stability, and reactivity. In particular, a bis(4-tert-butylphenyl)iodonium salt or a compound having a structure represented by the following formula (15) (trade name: "Adekaoptomer SP150", manufactured by ADEKA CORPORATION) is more preferred. A compound having a structure represented by the following formula (16) (trade name: "IRGACURE 261", manufactured by Ciba Specialty Chemicals Inc.) is also more preferred.

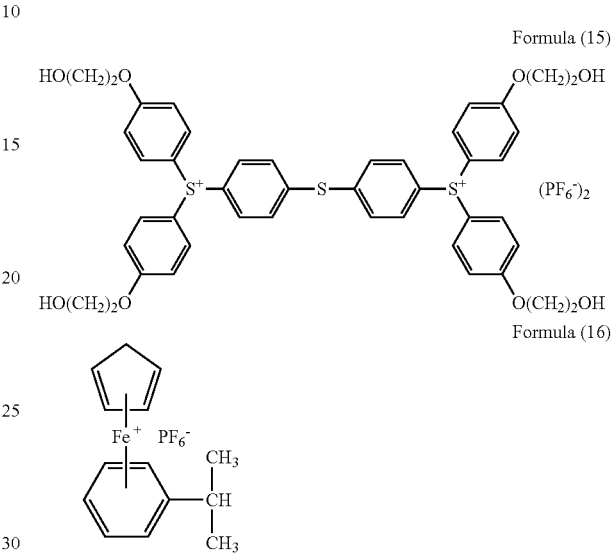

Formula (15)

Formula (16)

The usage of the cationic polymerization catalyst is preferably 0.1 mass % to 5.0 mass % with respect to the hydrolyzable condensate.

In addition, an estimated roughness (Rzjis; measured in conformity with JIS B 0601:2001) of the surface (=surface of the surface layer) of the charging member is preferably 10 μm or less, particularly preferably 7 μm or less from the viewpoint of the suppression of the sticking of toner or an external additive to the surface of the charging member. In addition, an estimated elastic modulus of the surface layer of the charging member is preferably 30 GPa or less from such a viewpoint that an abutment nip with the electrophotographic photosensitive member is sufficiently secured. Meanwhile, a crosslink density generally tends to reduce as the elastic modulus of the surface layer reduces. Accordingly, when the charging member is provided with the conductive elastic layer, the elastic modulus of the surface layer is preferably 100 MPa or more from the viewpoint of the suppression of the contamination of the surface of the electrophotographic photosensitive member due to the bleedout of a low-molecular weight component in the conductive elastic layer toward the surface of the charging member.

In addition, an estimated thickness of the surface layer is 0.01 μm or more and 1.00 μm or less, in particular, 0.05 μm or more and 0.50 μm or less.

Figure 2:
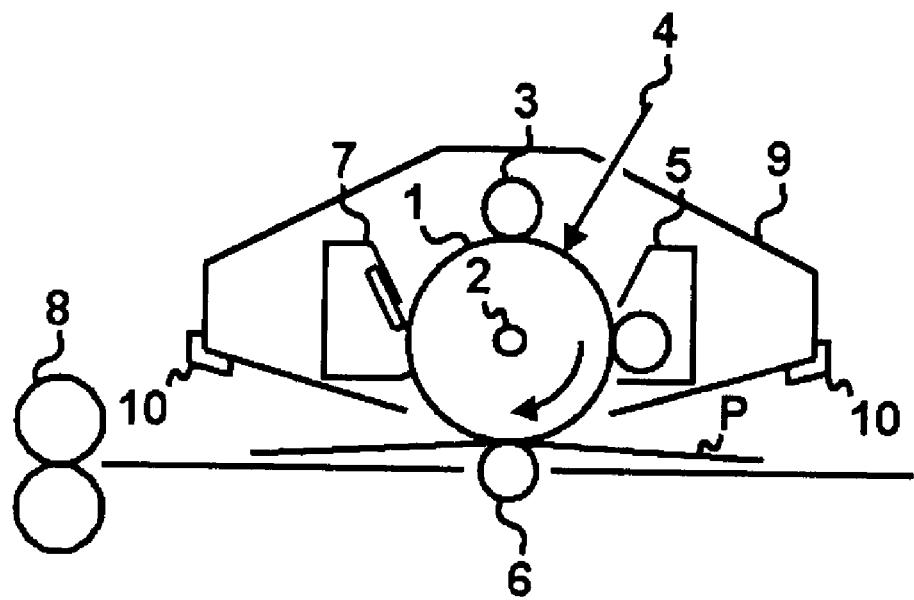
FIG. 2 is a schematic view of an electrophotographic apparatus including a process cartridge according to the present invention.

FIG. 2 illustrates an exemplary schematic configuration of an electrophotographic apparatus including a process cartridge having the charging member of the present invention. In FIG. 2, a cylindrical electrophotographic photosensitive member 1 is rotary-driven around a shaft 2 in the direction indicated by an arrow A at a predetermined circumferential speed. A charging member 3 (roller-shaped charging member in FIG. 2) according to the present invention is placed in contact with the electrophotographic photosensitive member 1. The charging member 3 is adapted to rotate in the forward direction with respect to the rotation of the electrophotographic photosensitive member 1. The surface of the electrophotographic photosensitive member 1 to be rotary-driven is evenly charged to a predetermined positive or negative potential by the charging member 3. Next, the surface receives exposure light (image exposure light) 4 output from an exposing unit (not illustrated) such as slit exposure or laser beam scanning exposure. Thus, electrostatic latent images corresponding to the target image are sequentially formed on the surface of the electrophotographic photosensitive member 1. Upon charging of the surface of the electrophotographic photosensitive member 1 by the charging member 3, a voltage formed only of a DC voltage or a voltage obtained by superimposing an AC voltage on the DC voltage is applied from a voltage-applying unit (not illustrated) to the charging member 3. The charging member of the present invention is preferably used in an electrophotographic apparatus having a voltage-applying unit for applying a voltage formed only of the DC voltage to the charging member. The DC voltage is preferably such that a dark potential and a light potential upon application of, for example, a voltage of −1,000 V are about −500 V and about −100 V, respectively.

The electrostatic latent images formed on the surface of the electrophotographic photosensitive member 1 are each subjected to development (reversal development or normal development) with toner in a developer of a developing unit 5. Thus, toner images are obtained. Next, the toner images formed on and carried by the surface of the electrophotographic photosensitive member 1 are sequentially transferred onto a transfer material (such as paper) P by a transferring bias from a transferring unit (such as a transferring roller) 6. In this case, the transfer material P is taken out of a transfer material-supplying unit (not illustrated) and fed into a gap (abutting portion) between the electrophotographic photosensitive member 1 and the transferring unit 6 in synchronization with the rotation of the electrophotographic photosensitive member 1. The transfer material P onto which the toner images have been transferred is separated from the surface of the electrophotographic photosensitive member 1 and introduced into a fixing unit 8 where the images are fixed. Thus, the resultant is printed out as an image-formed product (a print or a copy) to the outside of the apparatus. A developer (toner) that has not been transferred is removed from the surface of the electrophotographic photosensitive member 1 after the transfer of the toner images by a cleaning unit (such as a cleaning blade) 7.

The process cartridge according to the present invention integrally holds the charging member 3 according to the present invention, and at least one member selected from the electrophotographic photosensitive member 1, the developing unit 5, the transferring unit 6, and the cleaning unit 7, and is formed to be detachably mountable on the main body of the electrophotographic apparatus. For example, as illustrated in FIG. 2, the cartridge may be formed by integrally supporting the electrophotographic photosensitive member 1, the charging member 3, the developing unit 5, and the cleaning unit 7. Alternatively, for example, as illustrated in FIG. 2, the process cartridge may be a process cartridge 9 detachable from the main body of the electrophotographic apparatus with a guiding unit 10 such as the rail of the main body of the electrophotographic apparatus. In addition, an electrophotographic apparatus according to the present invention has the charging member according to the present invention and an electrophotographic photosensitive member placed in contact with the charging member. In addition, the electrophotographic apparatus preferably has a voltage-applying unit that applies only a DC voltage to the charging member.

EXAMPLES

Hereinafter, the present invention is described in more detail by way of specific examples. It should be noted that the term "part(s)" in the examples refers to "part(s) by mass".

Example 1

Production of Charging Member

Raw materials shown in Table 1 below were mixed in a 6-liter pressure kneader "TD6-15MDX" (trade name, manufactured by TOSHIN CO., LTD.) at a filling ratio of 70 vol % and a blade speed of 30 rpm for 16 minutes. Thus, an A-kneading rubber composition was obtained.

TABLE 1

| | |
|---|---|
| Nitrile rubber (trade name: JSR N230SV, manufactured by JSR Corporation) | 100 parts |
| Carbon black (trade name: TOKABLACK #7360SB, manufactured by TOKAI CARBON CO., LTD.) | 48 parts |
| Calcium carbonate (trade name: "NANOX #30", manufactured by MARUO CALCIUM CO., LTD.) | 20 parts |
| Bentonite (trade name: "BENGEL SH", manufactured by HOJUN Co., Ltd.) | 5 parts |
| Zinc oxide | 5 parts |
| Zinc stearate | 1 part |

A vulcanizing accelerator and a vulcanizing agent shown in Table 2 below were added to the A-kneading rubber composition, and then the mixture was bilaterally cut a total of twenty times with open rolls each having a roll diameter of 12 inches at a front roll speed of 8 rpm, a back roll speed of 10 rpm, and a roll interval of 2 mm. After that, the resultant was subjected to tight milling ten times at a roll interval of 0.5 mm. Thus, a kneaded product I was obtained.

TABLE 2

| | |
|---|---|
| Vulcanizing accelerator: tetrabenzylthiuram disulfide (trade name: "PERKACIT-TBzTD", manufactured by FLEXSYS) | 4.5 parts |
| Vulcanizing agent: sulfur | 1.2 parts |

Next, the kneaded product 1 was extruded into a cylindrical shape having an outer diameter of 9.4 mm and an inner diameter of 5.4 mm with a rubber extruder. The extruded product was cut to have a length of 250 mm, and was then subjected to primary curing in a vulcanizer with water vapor at 160° C. for 30 minutes. Thus, a primary-cured tube 1 for a conductive elastic layer was obtained.

Meanwhile, a columnar support made of steel (having a diameter of 6 mm, a length of 256 mm, and a nickel-plated surface) was prepared. A thermosetting adhesive (trade name: "METALOC U-20", manufactured by TOYO KAGAKU KENKYUSHO CO., LTD.) containing a metal and a rubber was applied to a region extending by up to 115.5 mm on both sides each with respect to the center in the axial direction of the columnar surface of the support (region having a total width in the axial direction of 231 mm). The resultant was dried at 80° C. for 30 minutes, and was then further dried at 120° C. for 1 hour. The support was inserted into the primary-cured tube 1 for a conductive elastic layer, and then the whole was heated at 160° C. for 1 hour so that the primary-cured tube 1 for a conductive elastic layer was subjected to secondary curing. As a result, the thermosetting adhesive was cured. Thus, a conductive elastic roller 1 before surface grinding was obtained.

Next, both ends of the conductive elastic layer portion (rubber portion) of the conductive elastic roller 1 before surface grinding were cut so that the conductive elastic layer portion had a width in the axial direction of 231 mm. Further, the surface of the conductive elastic layer portion was ground with a rotary grindstone. Thus, a conductive elastic roller (conductive elastic roller after surface grinding) 2 was obtained. The conductive elastic roller 2 had a crown-shaped conductive elastic layer having a diameter at each end of 8.2 mm and a diameter at the central portion of 8.5 mm, and the surface of the conductive elastic layer had a ten-point average roughness (Rzjis) of 5.5 μm and a deflection of 28 μm. In addition, the conductive elastic layer had an Asker C hardness of 78°.

The ten-point average roughness (Rzjis) was measured in conformity with JIS B 0601:2001. The deflection was measured with a high-accuracy laser measuring machine "LSM-430v" (trade name) manufactured by Mitutoyo Corporation. Specifically, outer diameters were measured with the measuring machine, and then a difference between the maximum outer diameter and the minimum outer diameter was defined as an outer diameter difference deflection. The measurement was performed at five points, and then the average of the outer diameter difference deflections at the five points was defined as the deflection of the product subjected to the measurement. In addition, as described above, the Asker C hardness was measured under the condition of a load of 1,000 g by bringing the indenter point of an ASKER Durometer Type C (manufactured by Kobunshi Keiki Co., Ltd.) into abutment with the surface of the measuring object.

Next, raw materials shown in Table 3 below were mixed, and then the mixture was stirred at room temperature. Next, the resultant was refluxed under heat (120° C.) for 24 hours. Thus, a hydrolyzable silane compound condensate-containing solution 1 was obtained.

TABLE 3

| | |
|---|---|
| Phenyltriethoxysilane (PhTES) (reference number: KBM-103, manufactured by Shin-Etsu Chemical Co., Ltd., molecular weight = 240.370 g/mol) | 42.03 g (0.179 mol) (corresponding to 55.94 mol % of the total amount of hydrolyzable silane compounds) |
| Glycidoxypropyltriethoxysilane (GPTES) (reference number: KBE-403, manufactured by Shin-Etsu Chemical Co., Ltd., molecular weight = 278.418 g/mol) | 12.53 g (0.045 mol) |
| Hexyltrimethoxysilane (HETMS) (reference number: KBM-3063, manufactured by Shin-Etsu Chemical Co., Ltd., molecular weight = 206.356 g/mol) | 13.21 g (0.032 mol) |
| Tridecafluoro-1,1,2,2-tetrahydrooctyltriethoxysilane (FTS) (reference number: SIT8175.0, manufactured by Gelest, Inc., number of carbon atoms of a perfluoroalkyl group: 6, molecular weight = 510.382 g/mol) | 16.33 g (0.032 mol) |
| Water | 25.93 g |
| Ethanol | 75.24 g |

Added to the condensate-containing solution 1 were 428.13 g of a solution prepared by diluting Silsesquioxane No. 1 (reference number: EP0409 (T8), manufactured by Hybrid Plastics, shown in Table 1) with methyl ethyl ketone (hereinafter referred to as "MEK") so as to have a concentration of 10 mass %. The foregoing corresponds to a state in which a molar ratio of Silsesquioxane No. 1 with respect to the total addition amount of the hydrolyzable silane compounds, i.e., 0.320 mol is 10.0 mol. The condensate-containing solution 1 containing Silsesquioxane No. 1 was added to a mixed solvent of 2-butanol and ethanol. Thus, a condensate-containing alcohol solution 1 having a solid content of 7 mass % was prepared. Further, a solution prepared by diluting an aromatic sulfonium salt (trade name: "Adekaoptomer SP-150", manufactured by ADEKA CORPORATION) with methanol (hereinafter referred to as "MeOH") so as to have a concentration of 10 mass % was added as a photocationic polymerization initiator at 4 mass % with respect to the condensate-containing alcohol solution 1. The mixture was diluted with ethanol. Thus, an application liquid 1 for a surface layer having a solid content of 2 mass % was prepared.

Next, the application liquid 1 for a surface layer was applied onto the conductive elastic layer of the conductive elastic roller (conductive elastic roller after surface grinding) 2 by ring application (discharge amount: 0.008 ml/s (speed of a ring portion: 30 mm/s, total discharge amount: 0.064 ml)). Then, the application liquid 1 for a surface layer applied onto the conductive elastic layer by ring application was irradiated with UV light having a wavelength of 254 nm so that an integral light quantity was 8,500 mJ/cm$^2$. Thus, the application liquid 1 for a surface layer was cured (curing by a crosslinking reaction). The cured product was left to stand for several seconds (2 to 3 seconds) so as to be dried. Thus, a surface layer was formed. A low-pressure mercury lamp manufactured by HARISON TOSHIBA LIGHTING Corporation was used for the irradiation of UV light. The crosslinking reaction of the application liquid 1 for a surface layer occurred probably because of the cleavage of a glycidoxy group in the condensate 1 caused by the irradiation of UV light. A charging roller 1 having the support, the conductive elastic layer formed on the support, and the surface layer (layer containing a polysiloxane formed by using the application liquid 1 for a surface layer) formed on the conductive elastic layer was produced as described above.

Examples 2 to 6

Charging rollers 2 to 6 were each produced in the same manner as in Example 1 except that Silsesquioxane No. 1 of Example 1 was changed to any one of Silsesquioxanes Nos. 2 to 6 shown in Table 4 below.

TABLE 4

| Silsesquioxane No. | Reference number | |
|---|---|---|
| 2 | 59386-9 | Manufactured by Sigma-Aldrich Japan |
| 3 | 59418-0 | Manufactured by Sigma-Aldrich Japan |
| 4 | 56032-4 | Manufactured by Sigma-Aldrich Japan |
| 5 | AK0243 | Manufactured by TOMEN PLASTICS CORPORATION |
| 6 | EP0425 | Manufactured by Hybrid Plastics |

Example 7

A charging roller 7 was produced in the same manner as in Example 1 except that Silsesquioxane No. 1 of Example 1 was changed to Silsesquioxane No. 7 obtained by synthesis in Synthesis Example 1 described below.

Synthesis Example 1

Loaded into a reaction vessel provided with a stirring machine, a dropping funnel, and a temperature gauge were 1.2 L of acetone as a solvent and 0.300 mol (70.90 g) of a starting material 1 represented by the following formula (17). The dropping funnel was charged with 320 mL of water, and then water was dropped at room temperature over 30 minutes while the reaction solution was stirred. After the termination of the dropping, the mixture was stirred for 2 hours without being heated. After that, the mixture was left to stand for about one month. The crystal thus produced was obtained as Silsesquioxane No. 7.
(Starting Material 1)

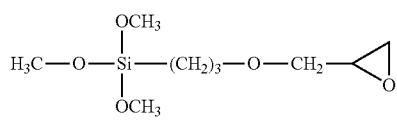

Formula (17)

The identification of the structure and an organic substituent of Silsesquioxane No. 8 thus obtained, and the calculation of its yield were performed with the following apparatuses:

a $^{29}$Si CP/MAS nuclear magnetic resonance spectrometer (manufactured by JEOL Ltd., hereinafter referred to as "$^{29}$Si-NMR");

a Fourier-transform infrared absorption spectrometer (manufactured by JASCO Corporation, hereinafter referred to as "FT-IR"); and a mass spectrometer after separation by high-performance liquid chromatography (manufactured by Shimadzu Corporation, hereinafter referred to as "LC-MS").

A signal specific to a cage-like structure was observed at around 55 ppm by $^{29}$Si-NMR. In addition, a peak specific to an Si—C bond, a peak specific to an Si—O—Si bond, and a peak specific to an epoxy group were observed at 2,175 cm$^{-1}$ and 770 cm$^{-1}$, 1,120 cm$^{-1}$, and 820 cm$^{-1}$, respectively by FT-IR. LC-MS confirmed that a base peak with a mass number (m/z) of 1,002 was derived from a structure obtained by the ionization of Silsesquioxane No. 6 (shown in Table 6) formed of six Si atoms as a result of the loss of one proton. Further, a ratio of a chromatogram peak with a mass number (m/z) of 1,002 as a base to a numerical value obtained by summing the area of the chromatogram peak with a mass number (m/z) of 1,002 as a base and the area of a chromatogram peak with a mass number (m/z) of 235 as a base derived from the ionized product of the starting material 1 was calculated. As a result, the ratio was 0.45. In other words, it was confirmed that the yield of Silsesquioxane No. 7 shown in Table 6 was 45%.

Examples 8 and 9

Charging rollers 8 and 9 were produced in the same manner as in Example 1 except that Silsesquioxane No. 1 of Example 1 was changed to Silsesquioxane No. 8 and 9 shown in Table 5 below.

TABLE 5

| Silsesquioxane No. | Reference number | |
|---|---|---|
| 8 | EP0409 (T10) | Manufactured by Hybrid Plastics |

TABLE 5-continued

| Silsesquioxane No. | Reference number | |
|---|---|---|
| 9 | EP0409 (T12) | Manufactured by Hybrid Plastics |

Example 10

A charging roller 14 was produced in the same manner as in Example 1 except that Silsesquioxane No. 1 of Example 1 was changed to Silsesquioxane No. 10 obtained by synthesis in Synthesis Example 2 described below.

Synthesis Example 2

Loaded into a reaction vessel provided with a stirring machine, a dropping funnel, and a temperature gauge were 120 ml of 2-propanol (hereinafter referred to as "IPA") as a solvent and 9.40 g of a 5% aqueous solution of tetramethylammonium hydroxide (hereinafter referred to as "TMAH aqueous solution") as a basic catalyst. The dropping funnel was charged with 45 ml of IPA and 0.150 mol (35.45 g) of the starting material 1, and then IPA and the starting material were dropped at room temperature over 30 minutes while the reaction solution was stirred. After the termination of the dropping, the mixture was stirred for 2 hours without being heated. After the two hours of stirring, the solvent was removed under reduced pressure, and then the remainder was dissolved with 250 ml of toluene. The reaction solution was washed with a saturated salt solution until the solution became neutral. After that, the resultant was dehydrated with anhydrous magnesium sulfate. Anhydrous magnesium sulfate was separated by filtration, and then the remainder was concentrated. Thus, Silsesquioxane No. 10 was obtained.

Example 11

A charging roller 11 was produced in the same manner as in Example 1 except that Silsesquioxane No. 1 of Example 1 was changed to Silsesquioxane No. 11 obtained simultaneously with the synthesis of Silsesquioxane No. 10 in Example 10.

Example 12

A charging roller 12 was produced in the same manner as in Example 1 except the following. 1,712.52 Grams of the solution of Example 1 prepared by diluting Silsesquioxane No. 1 with MEK so as to have a concentration of 10 mass % were added so that a molar ratio of Silsesquioxane No. 1 with respect to the total addition amount of the silane compounds, i.e., 0.320 mol was 40.0 mol.

Example 13

A charging roller 13 was produced in the same manner as in Example 1 except the following. 21.41 Grams of the solution of Example 1 prepared by diluting Silsesquioxane No. 1 with MEK so as to have a concentration of 10 mass % were added so that a molar ratio of Silsesquioxane No. 1 with respect to the total addition amount of the silane compounds, i.e., 0.320 mol was 0.5 mol.

Example 14

A charging roller 14 was produced in the same manner as in Example 1 except the following. 2,753.25 Grams of the solution of Example 1 prepared by diluting Silsesquioxane No. 1 with MEK so as to have a concentration of 10 mass % were added so that a molar ratio of Silsesquioxane No. 1 with respect to the total addition amount of the silane compounds, i.e., 0.320 mol was 60.0 mol.

The structures of Silsesquioxanes Nos. 1 to 11 used in Examples 1 to 14 are shown below. In addition, Table 6 shows the silsesquioxanes used in the respective examples and their addition amounts.

Silsesquioxane No. 1
(Number of Si atoms=8, molecular weight=1,337.904)
All $R_{201}$ to $R_{208}$ each represent a group represented by the following structural formula (18).

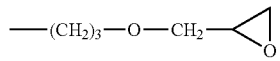

Formula (18)

Silsesquioxane No. 2
(Number of Si atoms=8, molecular weight=1,931.168)
All $R_{201}$ to $R_{208}$ each represent a group represented by the following formula (19).

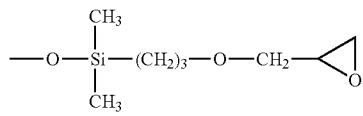

Formula (19)

Silsesquioxane No. 3
(Number of Si atoms=8, molecular weight=1,482.672)
All $R_{201}$ to $R_{208}$ each represent a group represented by the following formula (20).

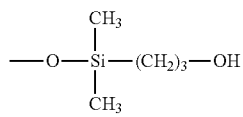

Formula (20)

Silsesquioxane No. 4
(Number of Si atoms=8, molecular weight=931.652)
All $R_{201}$ to $R_{207}$ each represent a group represented by the following formula (21).

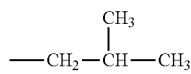

Formula (21)

$R_{208}$ represents a group represented by the following formula (22).

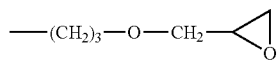

Formula (22)

Silsesquioxane No. 5
(Number of Si atoms=8, molecular weight=1,007.826)
All $R_{201}$ to $R_{207}$ each represent a group represented by the following formula (23).

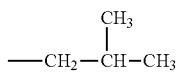

Formula (23)

$R_{208}$ represents a group represented by the following formula (24).

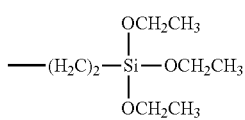

Formula (24)

Silsesquioxane No. 6
(Number of Si atoms=8, molecular weight=1,071.568)
All $R_{201}$ to $R_{207}$ each represent a phenyl group.
$R_{208}$ represents a group represented by the following formula (25).

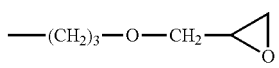

Formula (25)

Silsesquioxane No. 7
(Number of Si atoms=6, molecular weight=1,003.428)
All $R_{101}$ to $R_{106}$ each represent a group represented by the following formula (26).

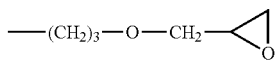

Formula (26)

Silsesquioxane No. 8
(Number of Si atoms=10, molecular weight=1,672.380)
All $R_{301}$ to $R_{310}$ each represent a group represented by the following formula (27).

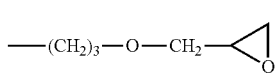

Formula (27)

Silsesquioxane No. 9
(Number of Si atoms=12, molecular weight=2,006.856)
All $R_{401}$ to $R_{412}$ each represent a group represented by the following formula (28).

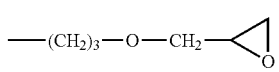

Formula (28)

Silsesquioxane No. 10
(Number of Si atoms=14, molecular weight=2,341.332)
All $R_{501}$ to $R_{514}$ each represent a group represented by the following formula (29).

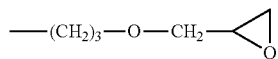

Formula (29)

Silsesquioxane No. 11
(Number of Si atoms=16, molecular weight=2,675.101)
All $R_{601}$ to $R_{616}$ each represent a group represented by the following formula (30).

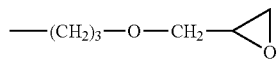

Formula (30)

TABLE 6

| Example | Silsesquioxane No. | Addition amount (g) |
|---|---|---|
| 1 | 1 | 428.13 |
| 2 | 2 | 617.97 |
| 3 | 3 | 474.46 |
| 4 | 4 | 298.13 |
| 5 | 5 | 322.50 |
| 6 | 6 | 342.90 |
| 7 | 7 | 321.10 |
| 8 | 8 | 535.16 |
| 9 | 9 | 642.19 |
| 10 | 10 | 749.23 |
| 11 | 11 | 856.26 |
| 12 | 1 | 1,712.52 |
| 13 | 1 | 21.41 |
| 14 | 1 | 2,753.25 |

Comparative Example 1

A charging roller C1 was obtained in the same manner as in Example 1 except the following, and its physical properties were measured. Raw materials shown in Table 7 below were mixed, and then the mixture was stirred at room temperature. Next, the resultant was refluxed under heat (100° C.) for 24 hours. Thus, a hydrolyzable silane compound condensate-containing solution C1 was obtained. After that, the condensate C1 was thermally cured at 160° C. for 1 hour. Thus, a surface layer was formed.

TABLE 7

| Phenyltriethoxysilane (PhTES) | 56.25 g (0.234 mol) |
|---|---|
| Hexyltrimethoxysilane (HeTMS) | 13.21 g (0.064 mol) |
| Tridecafluoro-1,1,2,2-tetrahydrooctyltriethoxysilane (FTS, number of carbon atoms of a perfluoroalkyl group: 6) | 11.23 g (0.022 mol) |
| Water | 25.93 g |
| Ethanol | 61.50 g |

Comparative Example 2

A charging roller C2 was obtained in the same manner as in Example 1 except the following, and its physical properties were measured. A silica filler (trade name: ADMAFINE, manufactured by Admatechs Company Limited, average particle diameter=1.0 μm, specific surface area=3.6 m²/g) was added at 0.5 mass % to the condensate-containing solution C1 used in Comparative Example 1.

(Measurement of Physical Properties of Charging Rollers)

The physical properties of the charging rollers of the examples and the comparative examples were measured by the following methods.

(1) Elastic Modulus of Surface Layer

The elastic modulus of each of the surface layers of the charging rollers was measured with a surface film physical property tester (trade name: "Fischer Scope H100V", manufactured by Fischer Instruments K.K.). A value when an indenter was caused to enter the surface of the measuring object at a rate of 1 μm/7 s was defined as the elastic modulus. It should be noted that a product obtained as described below was used as a sample for elastic modulus measurement. The application liquid for a surface layer was applied onto an aluminum sheet so that a thickness after curing was 10 μm or more. Then, the liquid was subjected to UV curing or thermal curing under the same conditions as those of any one of the charging rollers in the examples and the comparative examples. Table 8 shows the obtained results.

(2) Thickness of Surface Layer

The thickness of each of the surface layers of the charging rollers was measured by: collecting a vicinity of the surface layer of the charging roller from a base layer; depositing platinum from the vapor onto the collected sample piece from the sectional surface side of the surface layer; incorporating the resultant into a scanning electron microscope (trade name: "S-4800", manufactured by Hitachi High-Technologies Corporation); and observing the resultant with the microscope. Table 8 shows the obtained results.

(3) Ten-Point Average Roughness of Surface Layer

The ten-point average roughness (Rzjis) of each of the surface layers of the charging rollers was measured in conformity with JIS B 0601:2001. Table 8 shows the obtained results.

TABLE 8

| | Elastic modulus (MPa) | Thickness (nm) | Rzjis (μm) |
|---|---|---|---|
| Example 1 | 4,460 | 46 | 4.1 |
| Example 2 | 4,215 | 40 | 4.5 |
| Example 3 | 4,310 | 41 | 4.8 |
| Example 4 | 3,879 | 40 | 5.5 |
| Example 5 | 3,419 | 48 | 6.2 |
| Example 6 | 2,918 | 39 | 5.8 |
| Example 7 | 4,210 | 46 | 6.1 |
| Example 8 | 4,095 | 40 | 5.5 |
| Example 9 | 3,849 | 38 | 6.2 |
| Example 10 | 3,054 | 36 | 5.9 |
| Example 11 | 2,671 | 41 | 5.4 |
| Example 12 | 4,019 | 43 | 6.3 |
| Example 13 | 2,015 | 40 | 6.1 |
| Example 14 | 4,250 | 50 | 5.7 |
| Comparative Example 1 | 401 | 21 | 5.9 |
| Comparative Example 2 | 1,680 | 2,011 | 4.9 |

(4) Contents of Functional Groups in Polysiloxane

Under an optical microscope at a magnification of 10 to 1,000, a sample having a weight of about 1 mg was collected from each of the surface layers of the charging rollers with a three-dimensional coarse and fine micromanipulator (manufactured by NARISHIGE) placed in the optical microscope. A change in the concentration of a gas generated at the time of the heating of the collected sample on a mass number basis was tracked by a TG-MS method (a TG apparatus was directly coupled with an MS apparatus) as a function of a temperature simultaneously with a weight change. Table 9 shows measurement conditions.

TABLE 9

| Apparatus | TG-MS apparatus | TG apparatus | Shimadzu Corporation TG-40 Type |
|---|---|---|---|
| | | MS apparatus | Shimadzu Corporation GC/MS QP1000(1) |
| Measurement conditions | Initiation of measurement | After a sample has been set in a TG apparatus, a carrier gas is flowed for 15 minutes or more. Then, a temperature increase is started. | |
| | Heating condition | Room temperature to 1,000° C. (rate of temperature increase: 20° C./min) | |
| MS sensitivity | gain 3.5 | | |
| Mass number range | m/z = 10 to 300 In m/z, m represents a mass number and z represents an ionic valence. As the ionic valence is typically 1, m/z corresponds to the mass number. | | |
| Atmosphere | Helium (He) flow (30 ml/min) | | |

According to the TG-DTA obtained by the measurement under the conditions, significant weight reductions of two-stage were observed at around 400° C. to 500° C. and around 500° C. to 650° C.

Here, the following peaks were observed for gases generated at 400° C. to 500° C.

Mass numbers (m/z) of 31, 43, 58, and 59: peaks derived from oxyalkylene groups

Mass numbers (m/z) of 78 (benzene), 91 (toluene), and the like: peaks derived from aryl groups Mass numbers (m/z) of 16, 41, and the like: peaks derived from alkyl groups The concentrations of gas components derived from the respective groups generated from a polysiloxane decomposed at the respective temperatures of 400° C. to 500° C. were determined from the peaks. In addition, weight reduction percentages due to the gas components derived from the respective groups generated at the respective temperatures were determined from the concentrations of the gas components derived from the respective groups and the measured weight reduction percentage. The determined weight reduction percentages were integrated over the temperature range of 400° C. to 500° C. Thus, the contents of the oxyalkylene groups, aryl groups, and alkyl groups in the polysiloxane were determined.

In addition, peaks derived from fluorinated alkyl groups with mass numbers (m/z) of 51, 69, 119, and 131 were observed for gases generated at 500° C. to 650° C. The fluorinated alkyl groups are each assumed to be derived from a fluorinated alkyl group of tridecafluoro-1,1,2,2,tetrahydrooctyltriethoxysilane or from a substituent of a silsesquioxane. Then, the concentrations of gas components derived from fluorinated alkyl groups generated from the polysiloxane decomposed at the respective temperatures of 500° C. to 650° C. were determined from those peaks. In addition, a weight reduction percentage due to the gas components derived from the fluorinated alkyl groups generated at the respective temperatures was determined from the concentration of the gas components derived from the fluorinated alkyl groups and the measured weight reduction percentage. The determined weight reduction percentage was integrated over the temperature range of 500° C. to 600° C. Thus, the content of the fluorinated alkyl groups in the polysiloxane was determined. It should be noted that the residue after heating was regarded as a siloxane portion.

(5) Contents of Cage-Like Structure Derived from Silsesquioxane

Under an optical microscope at a magnification of 10 to 1,000, a sample having a weight of about 300 mg was collected from each of the surface layers of the charging rollers with a three-dimensional coarse and fine micromanipulator (manufactured by NARISHIGE) placed in the optical microscope. The collected sample was subjected to measurement with a solid $^{29}$Si CP/MAS nuclear magnetic resonance spectrometer (manufactured by JEOL Ltd., hereinafter referred to as "solid $^{29}$Si—NMR"). As a result, peaks specific to the cage-like structure of the silsesquioxane were observed at −55, −65, and −90 to −100 ppm.

The term "cage-like structure" refers to a skeletal portion formed of siloxane bonds except substituents in any such structure as represented in each of the compound units (1) to (6). The peak at around −55 ppm is mainly derived from a cage-like structure having six Si atoms in many cases. The peak at around −65 ppm is mainly derived from a cage-like structure having eight Si atoms in many cases. A value obtained by dividing the area of any one, or a combination of two or more kinds, of the above-mentioned peaks at −55, −65, and −90 to −100 ppm by the total of all peak areas was calculated as the percentage by mol of the cage-like structure in the surface layer.

(6) Contents of Oxyalkylene and Siloxane Derived from Substituents of Silsesquioxane Under an optical microscope at a magnification of 10 to 1,000, a sample having a weight of about 300 mg was collected from each of the surface layers of the charging rollers with a three-dimensional coarse and fine micromanipulator (manufactured by NARISHIGE) placed in the optical microscope. The collected sample was subjected to measurement with a solid $^{13}$CP/MAS nuclear magnetic resonance spectrometer (manufactured by JEOL Ltd., hereinafter referred to as "solid $^{13}$C-NMR") and solid $^{29}$Si-NMR. As a result, in the $^{13}$C-NMR, a peak specific to an oxyalkylene derived from a substituent of a silsesquioxan was observed at −72 to −85 ppm. It should be noted that it has been confirmed by similar analysis that a peak specific to the oxyalkylene produced after the cationic polymerization of glycidoxypropyltriethoxysilane appears at −65 to −70 ppm. Further, a peak (SiO$_2$) specific to the case where —O—Si was bonded to Si of the cage-like structure was observed at −107 to −110 ppm by solid $^{29}$Si-NMR. The percentages of the areas of the peaks derived from the above-mentioned oxyalkylene and siloxane were calculated as the percentages by mol of the oxyalkylene and siloxane derived from the substituents of the silsesquioxane in the surface layer, respectively.

Table 10 shows the contents of the oxyalkylene groups, aryl groups, alkyl groups, fluorinated alkyl groups, siloxane portions, and cage-like structures derived from the silsesquioxanes, and the contents of the oxyalkylenes and siloxanes derived from the substituents of the silsesquioxanes obtained by the measurement methods described in the sections (4), (5), and (6).

TABLE 10

|  | TG-MS | | | | | $^{29}$Si-NMR | | $^{13}$C-NMR |
| --- | --- | --- | --- | --- | --- | --- | --- | --- |
|  | Oxyalkylene group (mass %) | Aryl group (mass %) | Alkyl group (mass %) | Fluorinated alkyl group (mass %) | Siloxane portion (mass %) | Cage-like structure (mol %) | SiO$_2$ (Q4) (mol %) | C—O—C (mol %) |
| Example 1 | 35 | 7 | 23 | 5 | 30 | 9.8 | — | 18.4 |
| Example 2 | 32 | 10 | 19 | 6 | 33 | 8.9 | 18.7 | 20.0 |
| Example 3 | 36 | 8 | 20 | 8 | 28 | 7.8 | 12.8 | 11.3 |
| Example 4 | 16 | 6 | 24 | 7 | 47 | 7.9 | 16.7 | 4.5 |
| Example 5 | 21 | 5 | 25 | 6 | 43 | 9.7 | 9.4 | — |
| Example 6 | 28 | 15 | 18 | 6 | 33 | 8.4 | — | 19.8 |
| Example 7 | 21 | 13 | 16 | 9 | 41 | 8.8 | — | 17.6 |
| Example 8 | 13 | 6 | 20 | 10 | 51 | 9.4 | — | 20.1 |
| Example 9 | 10 | 10 | 19 | 9 | 52 | 8.1 | — | 21.3 |
| Example 10 | 11 | 13 | 14 | 6 | 56 | 9.2 | — | 13.6 |
| Example 11 | 10 | 9 | 25 | 10 | 46 | 9.9 | — | 14.9 |
| Example 12 | 12 | 8 | 29 | 8 | 43 | 29.4 | — | 19.1 |
| Example 13 | 16 | 9 | 5 | 5 | 65 | 0.5 | — | 5.6 |
| Example 14 | 12 | 8 | 30 | 10 | 40 | 51.4 | — | 26.5 |
| Comparative Example 1 | 0 | 10 | 34 | 7 | 49 | — | — | — |
| Comparative Example 2 | 0 | 9 | 29 | 8 | 54 | — | — | — |

(Evaluation of Charging Rollers)

The following evaluations were performed by using the charging rollers of the examples and the comparative examples.

First, each of the charging rollers and an electrophotographic photosensitive member are built in a process cartridge (trade name: "EP-85 (black)", manufactured by Canon Inc.) that integrally supports them. The process cartridge was mounted on a laser beam printer (trade name: "LBP-5500", manufactured by Canon Inc.) for longitudinally outputting A4 paper. The development mode of the laser beam printer is a reversal development mode. The laser beam printer outputs a transfer material at a speed of 47 mm/s, and has an image resolution of 600 dpi.

It should be noted that the electrophotographic photosensitive member built in the process cartridge together with the charging roller is an organic electrophotographic photosensitive member obtained by forming an organic photosensitive layer having a thickness of 14 μm on a support. In addition, the organic photosensitive layer is a laminated photosensitive layer obtained by laminating a charge-generating layer and a charge-transporting layer containing a modified polyarylate (binder resin) from the side of the support, and the charge-transporting layer serves as the surface layer of the electrophotographic photosensitive member.

In addition, a toner used in the laser beam printer is the so-called polymerized toner containing particles obtained by the suspension polymerization of a polymerizable monomer system containing a wax, a charge control agent, a pigment, styrene, butyl acrylate, and an ester monomer in an aqueous medium. The toner is a polymerized toner containing toner particles obtained by externally adding silica fine particles and titanium oxide fine particles to the particles, and the toner has a glass transition temperature of 63° C. and a volume-average particle diameter of 6 μm. Image output was performed under a 30° C./80% RH environment. An E-letter pattern having a print percentage of 4% was formed on A4 paper, and 10,000 sheets of the A4 paper were output at a process speed of 47 mm/s. Table 11 shows the results.

(1) Wear Resistance of Surface Layer

A ratio of the thickness (nm) of the surface layer after the output of the 10,000 sheets to the initial thickness (nm) of the surface layer was calculated as a retention ratio serving as an indicator for the wear resistance of the surface layer. By definition, the extent to which the surface layer wore enlarged as the retention ratio reduced. The thicknesses to be compared of the surface layer were measured by the above-mentioned method.

(2) Image Evaluation

With regard to an image evaluation, the occurrence of stripe-shaped image failures (hereinafter referred to as "longitudinal stripes") each appearing as a toner concentration difference resulting from the wear of the surface film was observed. An image obtained by drawing horizontal lines each having a width of one dot on A4 paper at an interval of two dots in the direction perpendicular to the rotation direction of the electrophotographic photosensitive member (half-tone image) was used as an image for use in the observation. The image evaluation was performed by visually observing an output image obtained at the time of the output of every 1,000 sheets from the first sheet (initial stage) to 10,000-th sheet of the image.

Evaluation criteria are as described below.

1: No longitudinal stripes occurred.

2: A very small number of longitudinal stripes occurred.

3: A large number of longitudinal stripes occurred.

TABLE 11

| | (1) | (2) | | | | | | | | | |
|---|---|---|---|---|---|---|---|---|---|---|---|
| | Retention ratio (%) | Initial stage | 1,000-th sheet | 2,000-th sheet | 3,000-th sheet | 4,000-th sheet | 5,000-th sheet | 6,000-th sheet | 7,000-th sheet | 8,000-th sheet | 9,000-th sheet | 10,000-th sheet |
| Example 1 | 98 | 1 | 1 | 1 | 1 | 1 | 1 | 1 | 1 | 1 | 1 | 1 |
| Example 2 | 98 | 1 | 1 | 1 | 1 | 1 | 1 | 1 | 1 | 1 | 1 | 1 |
| Example 3 | 98 | 1 | 1 | 1 | 1 | 1 | 1 | 1 | 1 | 1 | 1 | 1 |
| Example 4 | 93 | 1 | 1 | 1 | 1 | 1 | 1 | 1 | 1 | 1 | 2 | 2 |
| Example 5 | 94 | 1 | 1 | 1 | 1 | 1 | 1 | 1 | 1 | 1 | 2 | 1 |
| Example 6 | 95 | 1 | 1 | 1 | 1 | 1 | 1 | 1 | 1 | 2 | 2 | 2 |
| Example 7 | 92 | 1 | 1 | 1 | 1 | 1 | 1 | 1 | 1 | 1 | 1 | 1 |
| Example 8 | 86 | 1 | 1 | 1 | 1 | 1 | 1 | 1 | 1 | 1 | 1 | 2 |
| Example 9 | 84 | 1 | 1 | 1 | 1 | 1 | 1 | 1 | 1 | 1 | 1 | 2 |
| Example 10 | 80 | 1 | 1 | 1 | 1 | 1 | 1 | 1 | 1 | 2 | 2 | 2 |
| Example 11 | 79 | 1 | 1 | 1 | 1 | 1 | 1 | 1 | 2 | 2 | 2 | 2 |
| Example 12 | 88 | 1 | 1 | 1 | 1 | 1 | 1 | 1 | 1 | 1 | 1 | 2 |
| Example 13 | 89 | 1 | 1 | 1 | 1 | 1 | 1 | 2 | 2 | 2 | 2 | 2 |
| Example 14 | 93 | 1 | 1 | 1 | 1 | 1 | 1 | 1 | 1 | 1 | 2 | 2 |
| Comparative Example 1 | 50 | 1 | 2 | 2 | 2 | 2 | 2 | 2 | 2 | 3 | 3 | 3 |
| Comparative Example 2 | 19 | 1 | 2 | 2 | 3 | 3 | 3 | 3 | 3 | 3 | 3 | 3 |

As described above, according to the present invention, there can be provided a charging roller (charging member) capable of maintaining excellent wear resistance even after repeated use, and a process cartridge and an electrophotographic apparatus each having the charging roller (charging member).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-283902, filed Dec. 15, 2009, which is hereby incorporated by reference herein in its entirety.

What is claimed is:
1. A charging member, comprising:
a support; and
a surface layer,
wherein the surface layer comprises a polysiloxane bonded to a compound through a linking group,
wherein the polysiloxane has at least one unit represented by the following formula (A):

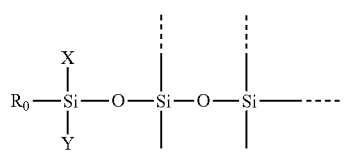

Formula (A)

where X is

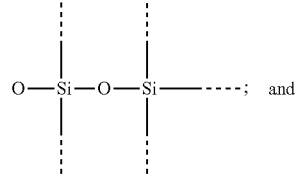

; Y is

-continued

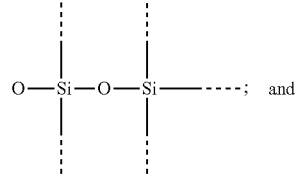

; and $R_0$ is used to form the linking group, and wherein the compound to which the polysiloxane is bonded is represented by one of the following formulas (1) to (6):

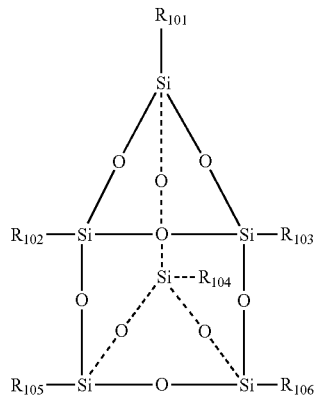

Formula (1)

where at least one of $R_{101}$ to $R_{106}$ represents a group which reacts with $R_0$ to form the linking group; and any others of $R_{101}$ to $R_{106}$ which do not react with $R_0$ to form the linking group each independently represent a substituted or unsubstituted alkyl group, or a substituted or unsubstituted aryl group;

Formula (2)

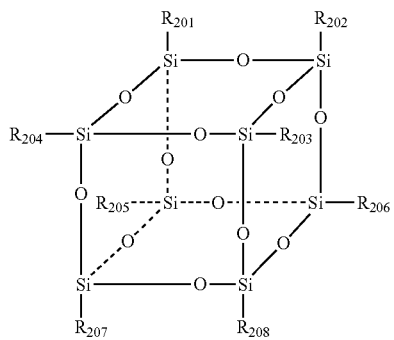

where at least one of $R_{201}$ to $R_{208}$ represents a group which reacts with $R_0$ to form the linking group; and any others of $R_{201}$ to $R_{208}$ which do not react with $R_0$ to form the linking group each independently represent a substituted or unsubstituted alkyl group, or a substituted or unsubstituted aryl group;

Formula (3)

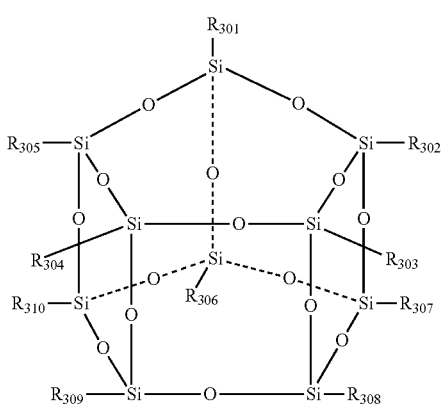

where at least one of $R_{301}$ to $R_{308}$ represents a group which reacts with $R_0$ to form the linking group; and any others of $R_{301}$ to $R_{308}$ which do not react with $R_0$ to form the linking group each independently represent a substituted or unsubstituted alkyl group, or a substituted or unsubstituted aryl group;

Formula (4)

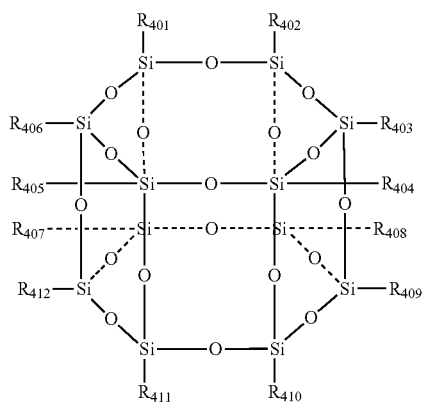

where at least one of $R_{401}$ to $R_{412}$ represents a group which reacts with $R_0$ to form the linking group; and any others of $R_{401}$ to $R_{412}$ which do not react with $R_0$ to form the linking group each independently represent a substituted or unsubstituted alkyl group, or a substituted or unsubstituted aryl group;

Formula (5)

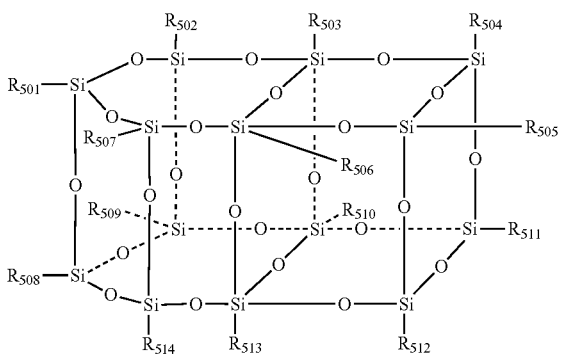

where at least one of $R_{501}$ to $R_{514}$ represents a group which reacts with $R_0$ to form the linking group; and any others of $R_{501}$ to $R_{514}$ which do not react with $R_0$ to form the linking group each independently represent a substituted or unsubstituted alkyl group, or a substituted or unsubstituted aryl group; or Formula (6)

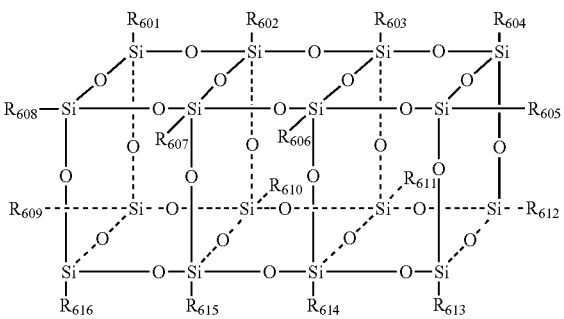

where at least one of $R_{601}$ to $R_{616}$ represents a group which reacts with $R_0$ to form the linking group; and any others of $R_{601}$ to $R_{616}$ which do not react with $R_0$ to form the linking group each independently represent a substituted or unsubstituted alkyl group, or a substituted or unsubstituted aryl group.

2. An electrophotographic apparatus, comprising:
the charging member according to claim 1; and
an electrophotographic photosensitive member placed in contact with the charging member.

3. A process cartridge comprising the charging member according to claim 1, and at least one member selected from an electrophotographic photosensitive member, a developing unit, a transferring unit, and a cleaning unit, wherein the process cartridge is formed to be detachably mountable on a main body of an electrophotographic apparatus.

4. The charging member according to claim 1, wherein the compound to which the polysiloxane is bonded is represented by formula (1), and
$R_0$ and at least one of $R_{101}$ to $R_{106}$ reacting with $R_0$ are groups selected from the group consisting of groups represented by the following formulas (7) and (8):

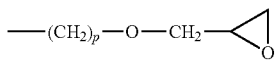

Formula (7)

where p represents an integer from 1 to 10;

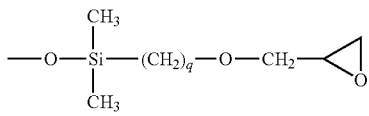

Formula (8)

where q represents an integer from 1 to 10.

5. The charging member according to claim 1, wherein the compound to which the polysiloxane is bonded is represented by the formula (2), and $R_0$ and at least one of $R_{201}$ to $R_{208}$ reacting with $R_0$ are groups selected from the group consisting of groups represented by the following formulas (7) and (8):

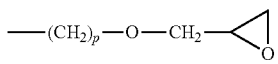

Formula (7)

where p represents an integer from 1 to 10; and

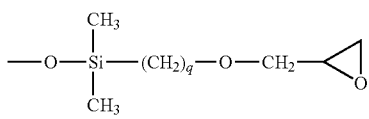

Formula (8)

where q represents an integer from 1 to 10.

6. The charging member according to claim 1, wherein the compound to which the polysiloxane is bonded is represented by the formula (3), and $R_0$ and at least one of $R_{301}$ to $R_{310}$ reacting with $R_0$ are groups selected from the group consisting of groups represented by the following formulas (7) and (8):

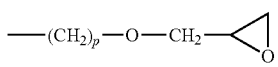

Formula (7)

where p represents an integer from 1 to 10; and

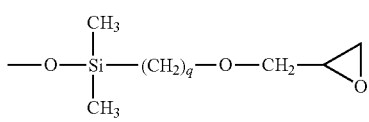

Formula (8)

where q represents an integer from 1 to 10.

7. The charging member according to claim 1, wherein the compound to which the polysiloxane is bonded is represented by the formula (4), and $R_0$ and at least one of $R_{401}$ to $R_{412}$ reacting with $R_0$ are groups selected from the group consisting of groups represented by the following formulas (7) and (8):

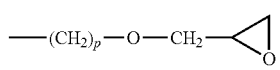

Formula (7)

where p represents an integer from 1 to 10; and

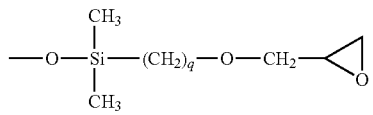

Formula (8)

where q represents an integer from 1 to 10.

8. The charging member according to claim 1, wherein the compound to which the polysiloxane is bonded is represented by the formula (5), and $R_0$ and at least one of $R_{501}$ to $R_{514}$ reacting with $R_0$ are groups selected from the group consisting of groups represented by the following formulas (7) and (8):

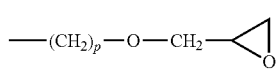

Formula (7)

where p represents an integer from 1 to 10; and

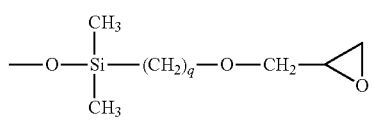

Formula (8)

where q represents an integer from 1 to 10.

9. The charging member according to claim 1, wherein the compound to which the polysiloxane is bonded is represented by the formula (6), and $R_0$ and at least one of $R_{601}$ to $R_{616}$ reacting with $R_0$ are groups selected from the group consisting of groups represented by the following formulas (7) and (8):

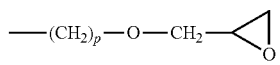

Formula (7)

where p represents an integer from 1 to 10; and

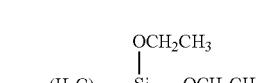

Formula (10)

where q represents an integer from 1 to 10.

* * * * *